US012353210B2

(12) United States Patent
Wilson et al.

(10) Patent No.: US 12,353,210 B2
(45) Date of Patent: Jul. 8, 2025

(54) APPARATUS, SYSTEMS AND METHODS FOR AUTOMATED NAVIGATION OF AGRICULTURAL EQUIPMENT

(71) Applicant: Ag Leader Technology, Ames, IA (US)

(72) Inventors: David Wilson, Prairie City, IA (US); Adam Fett, Nevada, IA (US); Caleb Huitt, Story City, IA (US); A J Steenhoek, Mingo, IA (US); Kolton Rottink, Santa Clarita, CA (US); Mitchell Freshour, Urbandale, IA (US); Nate Mohling, Ankeny, IA (US); Ryan Kool, Elkhart, IA (US); Steve Schulteis, Story City, IA (US); Bill Cran, Ames, IA (US); Joe Holoubek, Ames, IA (US); Luke Call, Ames, IA (US); Mike Myers, Madison, WI (US)

(73) Assignee: Ag Leader Technology, Ames, IA (US)

( * ) Notice: Subject to any disclaimer, the term of this patent is extended or adjusted under 35 U.S.C. 154(b) by 195 days.

(21) Appl. No.: 16/939,785

(22) Filed: Jul. 27, 2020

(65) Prior Publication Data
US 2021/0026362 A1     Jan. 28, 2021

Related U.S. Application Data

(60) Provisional application No. 62/878,553, filed on Jul. 25, 2019.

(51) Int. Cl.
  *G05D 1/02*     (2020.01)
  *A01B 69/04*    (2006.01)
  (Continued)

(52) U.S. Cl.
  CPC ......... *G05D 1/0214* (2013.01); *A01B 69/008* (2013.01); *B60K 35/00* (2013.01);
  (Continued)

(58) Field of Classification Search
None
See application file for complete search history.

(56) References Cited

U.S. PATENT DOCUMENTS

| 4,077,651 A | 3/1978 | Steinbach et al. |
| 4,155,417 A | 5/1979 | Ziems |

(Continued)

FOREIGN PATENT DOCUMENTS

| AU | 2016287397 B2 | 6/2016 |
| CN | 108362267 A | 8/2018 |

(Continued)

OTHER PUBLICATIONS

Mulakala, "Measurement Accuracy of the DJI Phantom 4 RTK & Photogrammetry", , pp. 1-18, Publisher: DroneDeploy.

(Continued)

*Primary Examiner* — Tamara L Weber
(74) *Attorney, Agent, or Firm* — Dentons Davis Brown PC; Matthew Warner-Blankenship

(57) ABSTRACT

The disclosure relates to the system and methods for generating a guidance path for automated navigation of large agricultural equipment. Vehicle path data from leading vehicles can be recorded, stored or inputted into the system for generation of guidance paths offset from the swaths traversed by the leading vehicle. Combines, planters sprayers and other vehicles utilizing guidance system can be used to record leading vehicle data for use by the following vehicle in real time or in subsequent cycles. Enterprise systems can manage multiple grain carts and/or combines or other vehicles to maximize efficiency.

20 Claims, 21 Drawing Sheets

(51) Int. Cl.
*B60K 35/00* (2006.01)
*B60Q 9/00* (2006.01)
*G05D 1/00* (2006.01)
*B60K 35/10* (2024.01)
*B60K 35/28* (2024.01)

(52) U.S. Cl.
CPC ........... *B60Q 9/008* (2013.01); *G05D 1/0295* (2013.01); *B60K 35/10* (2024.01); *B60K 35/28* (2024.01); *B60K 2360/166* (2024.01)

(56) References Cited

U.S. PATENT DOCUMENTS

| | | |
|---|---|---|
| 4,166,349 A | 9/1979 | Coenenberg |
| 4,197,690 A | 4/1980 | Eistert |
| 4,319,643 A | 3/1982 | Carter et al. |
| 4,482,960 A | 11/1984 | Pryor |
| 4,508,176 A | 4/1985 | Wiegardt |
| 4,967,362 A | 10/1990 | Schutten |
| 5,143,159 A | 9/1992 | Young |
| 5,240,079 A | 8/1993 | Schmidt |
| 5,253,172 A | 10/1993 | Ito |
| 5,264,409 A | 11/1993 | Kamimura |
| 5,264,709 A | 11/1993 | Kamimura |
| 5,279,068 A | 1/1994 | Rees et al. |
| 5,471,391 A | 11/1995 | Gudat et al. |
| 5,585,626 A | 12/1996 | Beck |
| 5,646,844 A | 7/1997 | Gudat et al. |
| 5,837,997 A | 11/1998 | Beck |
| 5,995,902 A | 11/1999 | Monson |
| 6,089,344 A | 7/2000 | Baughn |
| 6,198,992 B1 | 3/2001 | Winslow |
| 6,236,936 B1 | 5/2001 | Berstis et al. |
| 6,275,771 B1 | 8/2001 | Berstis et al. |
| 6,338,023 B1 | 1/2002 | Bourgeois |
| 6,463,374 B1 | 10/2002 | Keller |
| 6,484,078 B1 | 11/2002 | Kageyama |
| 6,490,539 B1 | 12/2002 | Ukai |
| 6,501,422 B1 | 12/2002 | Nichols |
| 6,529,823 B1 | 3/2003 | Berstis et al. |
| 6,686,951 B1 | 2/2004 | Dickson |
| 6,732,024 B2 | 5/2004 | Wilhelm Rekow et al. |
| 6,741,921 B2 | 5/2004 | Cohen et al. |
| 6,856,879 B2 | 2/2005 | Arakawa et al. |
| 6,917,300 B2 | 7/2005 | Allen |
| 6,943,824 B2 | 9/2005 | Alexia et al. |
| 6,946,824 B2 | 9/2005 | Waizman et al. |
| 7,171,769 B2 | 2/2007 | Schultz |
| 7,256,388 B2 | 8/2007 | Eglington et al. |
| 7,349,779 B2 | 3/2008 | Nelson |
| 7,350,806 B2 | 4/2008 | Ridolfi |
| 7,360,623 B2 | 4/2008 | Green et al. |
| 7,369,924 B2 | 5/2008 | Han |
| 7,628,239 B1 | 12/2009 | Louie |
| 7,648,004 B1 | 1/2010 | Larouche et al. |
| 7,734,386 B2 | 6/2010 | DelNero et al. |
| 7,777,615 B2 | 8/2010 | Okuda |
| 8,078,338 B2 | 12/2011 | Pack et al. |
| 8,126,620 B2 | 2/2012 | Ringwald et al. |
| 8,180,514 B2 | 5/2012 | Kaprielian et al. |
| 8,195,342 B2 | 6/2012 | Anderson |
| 8,214,111 B2 | 7/2012 | Heiniger |
| 8,392,065 B2 | 3/2013 | Tolstedt |
| 8,437,901 B2 | 5/2013 | Anderson |
| 8,494,726 B2 | 7/2013 | Peake |
| 8,589,013 B2 | 11/2013 | Pieper et al. |
| 8,605,947 B2 | 12/2013 | Zhang |
| 8,634,993 B2 | 1/2014 | McClure |
| 8,639,408 B2 | 1/2014 | Anderson |
| 8,706,394 B2 | 4/2014 | Trepagnier et al. |
| 8,781,658 B2 | 7/2014 | Simonini |
| 8,781,685 B2 | 7/2014 | McClure |
| 8,814,640 B2 | 8/2014 | Behnke et al. |
| 8,892,308 B2 | 11/2014 | Davis |
| 9,002,565 B2 | 4/2015 | Jones et al. |
| 9,020,757 B2 | 4/2015 | Peake |
| 9,043,096 B2 | 5/2015 | Zielke |
| 9,052,714 B2 | 6/2015 | Creasey et al. |
| 9,098,085 B2 | 8/2015 | Aznavorian et al. |
| 9,129,523 B2 | 9/2015 | Martin |
| 9,162,703 B2 | 10/2015 | Miller et al. |
| 9,188,986 B2 | 11/2015 | Baumann |
| 9,213,905 B2 | 12/2015 | Lange et al. |
| 9,265,187 B2 | 2/2016 | Cavender-Bares et al. |
| 9,374,940 B2 | 6/2016 | Nelson |
| 9,392,743 B2 | 7/2016 | Camacho-Cook et al. |
| 9,393,990 B2 | 7/2016 | Davis |
| 9,417,120 B2 | 8/2016 | Zielke |
| 9,420,203 B2 | 8/2016 | Broggi et al. |
| 9,420,737 B2 | 8/2016 | Trimble |
| 9,423,509 B2 | 8/2016 | Georgy |
| 9,446,791 B2 | 9/2016 | Nelson, Jr. |
| 9,451,367 B2 | 9/2016 | Basseas et al. |
| 9,464,913 B2 | 10/2016 | Brown et al. |
| 9,489,576 B2 | 11/2016 | Johnson |
| 9,503,850 B2 | 11/2016 | Sheha |
| 9,510,498 B2 | 12/2016 | Tuttle et al. |
| 9,527,211 B2 | 12/2016 | Posselius et al. |
| 9,545,048 B2 | 1/2017 | Pickett et al. |
| 9,582,002 B2 | 2/2017 | Cavender-Bares |
| 9,615,497 B2 | 4/2017 | Bassett et al. |
| 9,675,008 B1 | 6/2017 | Rusciolelli et al. |
| 9,795,074 B2 | 10/2017 | Stratton |
| 9,804,603 B1 | 10/2017 | Yegerlehner |
| 9,807,934 B2 | 11/2017 | Busciolelli et al. |
| 9,840,003 B2 | 12/2017 | Stzatmary |
| 9,849,828 B2 | 12/2017 | Foster et al. |
| 9,857,478 B2 | 1/2018 | Joughin |
| 9,861,040 B2 | 1/2018 | Bonefas |
| 9,880,560 B2 | 1/2018 | Han |
| 9,898,688 B2 | 2/2018 | Bleiweiss |
| 9,936,637 B2 | 4/2018 | Anderson |
| 9,964,559 B2 | 5/2018 | Zielke et al. |
| 9,996,081 B2 | 6/2018 | Owens |
| 10,065,722 B1 | 9/2018 | Jaszewski et al. |
| 10,099,609 B2 | 10/2018 | Pagliani |
| 10,104,822 B2 | 10/2018 | Couchman |
| 10,104,827 B2 | 10/2018 | Adamchuk et al. |
| 10,114,378 B2 | 10/2018 | Korthals et al. |
| 10,130,022 B2 | 11/2018 | Kinze |
| 10,131,376 B2 | 11/2018 | Mortimer |
| 10,143,126 B2 | 12/2018 | Foster et al. |
| 10,152,891 B2 | 12/2018 | Rusciolelli et al. |
| 10,165,722 B2 | 1/2019 | Ackerman et al. |
| 10,168,714 B2 | 1/2019 | Webber |
| 10,206,324 B2 | 2/2019 | Gerrish |
| 10,215,572 B2 | 2/2019 | Urano et al. |
| 10,246,087 B2 | 4/2019 | Mitchell et al. |
| 10,254,765 B2 | 4/2019 | Rekow |
| 10,255,670 B1 | 4/2019 | Wu et al. |
| 10,264,431 B2 | 4/2019 | Vandapel et al. |
| 10,267,820 B2 | 4/2019 | Zielke et al. |
| 10,272,940 B2 | 4/2019 | Staehle |
| 10,299,422 B2 | 5/2019 | Schleicher |
| 10,324,471 B2 | 6/2019 | Etoh |
| 10,328,934 B2 | 6/2019 | Minster |
| 10,338,594 B2 | 7/2019 | Long |
| 10,365,404 B2 | 7/2019 | Collins |
| 10,384,709 B2 | 8/2019 | Joughin |
| 10,398,084 B2 | 9/2019 | Ray et al. |
| 10,407,873 B2 | 9/2019 | Ono |
| 10,412,893 B2 | 9/2019 | Missotten et al. |
| 10,479,354 B2 | 11/2019 | Posselius |
| 10,491,879 B2 | 11/2019 | Redden |
| 10,531,603 B2 | 1/2020 | Ferrari et al. |
| 10,551,844 B2 | 2/2020 | Biber et al. |
| 10,575,453 B2 | 3/2020 | Blackwell et al. |
| 10,583,832 B2 | 3/2020 | Foster et al. |
| 10,612,932 B2 | 4/2020 | Sunil Kumar |
| 10,633,023 B2 | 4/2020 | Ghannam |
| 10,635,110 B2 | 4/2020 | Shashua |
| 10,684,305 B2 | 6/2020 | Zielke et al. |
| 10,696,227 B2 | 6/2020 | Stein |
| 10,698,402 B2 | 6/2020 | Kosa et al. |

(56) References Cited

U.S. PATENT DOCUMENTS

| | | |
|---|---|---|
| 10,747,233 B2 | 8/2020 | Ogura |
| 10,780,930 B1 | 9/2020 | Kentley-Klay |
| 10,788,835 B2 | 9/2020 | Hurd et al. |
| 10,795,351 B2 | 10/2020 | Hurd |
| 10,820,508 B2 | 11/2020 | Dix |
| 10,822,017 B2 | 11/2020 | Tan |
| 10,845,810 B2 | 11/2020 | Flajolet |
| 10,962,376 B2 | 3/2021 | Fong et al. |
| 10,966,369 B2 | 4/2021 | Suleman |
| 11,091,192 B2 | 8/2021 | McMickell |
| 11,092,696 B2 | 8/2021 | Eriksson |
| 11,093,745 B2 | 8/2021 | Redden |
| 11,315,258 B1 | 4/2022 | Anagnostopoulos |
| 11,429,114 B2 | 8/2022 | Davis |
| 11,612,096 B2 | 3/2023 | Sivinski |
| 11,697,414 B2 | 7/2023 | Simmons |
| 11,790,539 B1 | 10/2023 | Anagnostopoulos |
| 2001/0048755 A1 | 12/2001 | Wiens |
| 2002/0059320 A1 | 5/2002 | Tamaru |
| 2002/0072850 A1* | 6/2002 | McClure .............. A01B 69/008 701/25 |
| 2003/0023353 A1 | 1/2003 | Badarneh |
| 2003/0085042 A1 | 5/2003 | Rogala |
| 2004/0158355 A1 | 8/2004 | Holmqvist |
| 2004/0264761 A1 | 12/2004 | Mas |
| 2005/0074143 A1 | 4/2005 | Kawai |
| 2006/0178825 A1 | 8/2006 | Eglington |
| 2007/0021913 A1 | 1/2007 | Heiniger |
| 2007/0071311 A1 | 3/2007 | Rovira-Mas |
| 2007/0112700 A1 | 5/2007 | Den Haan |
| 2008/0103690 A1* | 5/2008 | Dix ...................... A01B 69/008 701/50 |
| 2008/0141814 A1 | 6/2008 | Markfort |
| 2008/0215203 A1 | 9/2008 | Dix |
| 2008/0306655 A1 | 12/2008 | Dickson |
| 2009/0037041 A1 | 2/2009 | Senneff |
| 2009/0099730 A1 | 4/2009 | McClure |
| 2009/0112410 A1 | 4/2009 | Shull |
| 2009/0118904 A1 | 5/2009 | Birnie |
| 2010/0006308 A1 | 1/2010 | Schmidt |
| 2010/0026555 A1 | 2/2010 | Whittaker et al. |
| 2010/0032492 A1 | 2/2010 | Grimm |
| 2010/0094481 A1 | 4/2010 | Anderson |
| 2011/0056753 A1 | 3/2011 | Middlemiss et al. |
| 2011/0056762 A1 | 3/2011 | Markfort |
| 2011/0098890 A1 | 4/2011 | Lee |
| 2011/0196565 A1 | 8/2011 | Collins |
| 2011/0235923 A1 | 9/2011 | Weisenburger |
| 2012/0050023 A1 | 3/2012 | Sauder |
| 2012/0130593 A1 | 5/2012 | Davis |
| 2012/0215410 A1* | 8/2012 | McClure ................ G01S 19/04 701/50 |
| 2013/0131925 A1 | 5/2013 | Isaji |
| 2013/0186657 A1 | 7/2013 | Kormann et al. |
| 2014/0163806 A1 | 6/2014 | Aznavorian |
| 2014/0324291 A1 | 10/2014 | Jones |
| 2015/0041238 A1 | 2/2015 | Davis |
| 2015/0081156 A1 | 3/2015 | Trepagnier |
| 2015/0237795 A1 | 8/2015 | Koch |
| 2015/0264866 A1 | 9/2015 | Foster |
| 2015/0343403 A1 | 12/2015 | Ruhland |
| 2015/0359163 A1 | 12/2015 | Nelson |
| 2016/0214643 A1 | 7/2016 | Joughin |
| 2016/0229555 A1 | 8/2016 | Millin |
| 2016/0280250 A1 | 9/2016 | Stahle |
| 2017/0016870 A1 | 1/2017 | McPeek |
| 2017/0102702 A1 | 4/2017 | Ishijima |
| 2017/0135277 A1 | 5/2017 | Hiramatsu et al. |
| 2017/0147005 A1* | 5/2017 | Ramm ................ G05D 1/0295 |
| 2017/0242095 A1 | 6/2017 | Schuh |
| 2017/0248963 A1 | 8/2017 | Levinson et al. |
| 2017/0249517 A1 | 8/2017 | Cho |
| 2017/0357267 A1 | 12/2017 | Foster et al. |
| 2017/0359941 A1 | 12/2017 | Czapka |
| 2018/0017965 A1 | 1/2018 | Kosa |
| 2018/0024549 A1 | 1/2018 | Hurd |
| 2018/0081058 A1 | 3/2018 | Kalscheur |
| 2018/0084727 A1 | 3/2018 | Andrios |
| 2018/0096605 A1 | 4/2018 | Bai |
| 2018/0201299 A1 | 7/2018 | Ashtari |
| 2018/0216942 A1 | 8/2018 | Wang |
| 2018/0326982 A1 | 11/2018 | Paris |
| 2018/0329415 A1 | 11/2018 | Aoi |
| 2019/0021211 A1 | 1/2019 | Gutknecht |
| 2019/0039626 A1 | 2/2019 | Hatano |
| 2019/0071092 A1 | 3/2019 | Ma |
| 2019/0075706 A1 | 3/2019 | Cavender-Bares |
| 2019/0090472 A1 | 3/2019 | Crinklaw et al. |
| 2019/0124822 A1 | 5/2019 | Czapka |
| 2019/0133024 A1 | 5/2019 | Gerrish |
| 2019/0146511 A1 | 5/2019 | Hurd et al. |
| 2019/0174667 A1 | 6/2019 | Gresch et al. |
| 2019/0275939 A1 | 9/2019 | Kim |
| 2019/0302799 A1 | 10/2019 | Schaff |
| 2020/0023835 A1 | 1/2020 | Harda |
| 2020/0100421 A1 | 4/2020 | Wang |
| 2020/0133262 A1 | 4/2020 | Suleman |
| 2020/0150673 A1 | 5/2020 | Qiu |
| 2020/0178455 A1 | 6/2020 | Ishikawa |
| 2020/0193589 A1 | 6/2020 | Peshlov et al. |
| 2020/0231210 A1 | 7/2020 | Anderson |
| 2020/0352082 A1 | 11/2020 | Maeder |
| 2020/0352088 A1 | 11/2020 | Arnett |
| 2021/0000006 A1 | 1/2021 | Ellaboudy |
| 2021/0003416 A1 | 1/2021 | Wilson et al. |
| 2021/0051837 A1 | 2/2021 | Barry et al. |
| 2021/0053561 A1 | 2/2021 | Beller |
| 2021/0094539 A1 | 4/2021 | Beller |
| 2021/0132618 A1 | 5/2021 | Van Roekel |
| 2021/0161060 A1 | 6/2021 | Kaufmann |
| 2021/0185882 A1 | 6/2021 | Eichhorn |
| 2021/0195824 A1 | 7/2021 | Van Roekel |
| 2021/0195840 A1 | 7/2021 | Puryk |
| 2021/0294337 A1 | 9/2021 | Van Mill |
| 2021/0315147 A1 | 10/2021 | Fanshier |
| 2021/0364631 A1 | 11/2021 | Hasegawa et al. |
| 2021/0365036 A1 | 11/2021 | Dix |
| 2021/0396528 A1 | 12/2021 | St. Romain |
| 2022/0011444 A1 | 1/2022 | Eichhorn et al. |
| 2022/0026226 A1 | 1/2022 | Eichhorn |
| 2022/0061202 A1 | 3/2022 | Holoubek et al. |
| 2022/0078975 A1 | 3/2022 | Slichter |
| 2022/0105932 A1 | 4/2022 | Omikawa |
| 2022/0130145 A1 | 4/2022 | Connary |
| 2022/0232759 A1 | 7/2022 | Sauder |
| 2022/0272888 A1 | 9/2022 | Hodel |
| 2022/0284669 A1 | 9/2022 | Heinonen |
| 2022/0317678 A1 | 10/2022 | Li |
| 2022/0332365 A1 | 10/2022 | Calderon |
| 2022/0363280 A1 | 11/2022 | Calderon |
| 2022/0365163 A1 | 11/2022 | Baek |
| 2022/0386527 A1 | 12/2022 | Schleicher |
| 2023/0229163 A1 | 7/2023 | Rust |
| 2023/0230202 A1 | 7/2023 | Eichhorn et al. |
| 2023/0292664 A1 | 9/2023 | Zielke et al. |
| 2024/0000011 A1 | 1/2024 | Zielke et al. |
| 2024/0044346 A1 | 2/2024 | Barry et al. |
| 2024/0053759 A1 | 2/2024 | Wilson |
| 2024/0381803 A1 | 11/2024 | Wagner |
| 2024/0389494 A1 | 11/2024 | Vorobiev |
| 2025/0002070 A1 | 1/2025 | Brand |
| 2025/0008874 A1 | 1/2025 | Townsend |

FOREIGN PATENT DOCUMENTS

| | | |
|---|---|---|
| DE | 102013203549 A1 | 9/2014 |
| EP | 1773647 B1 | 2/2010 |
| EP | 2511152 A1 | 11/2013 |
| JP | 2022060934 A | 4/2022 |
| KR | 101728137 B1 | 4/2017 |
| WO | 2017004074 A1 | 1/2017 |
| WO | 2017074863 A1 | 5/2017 |

(56) References Cited

FOREIGN PATENT DOCUMENTS

| | | |
|---|---|---|
| WO | 2018165199 A4 | 9/2018 |
| WO | 2019042956 A1 | 3/2019 |

OTHER PUBLICATIONS

Pajares et al., "Machine-Vision Systems Selection for Agricultural Vehicles: a Guide", Journal of Imaging, Nov. 22, 2016, pp. 1-31, vol. 2, No. 34, Publisher: MDPI.

PIX4D, "How to calibrate a Perspective Lens Camera", https://support.pix4d.com/hc/en-us/articles/206065716-How-to-calibrate-a-Perspective-Lens-Camera.

"Dp RTK/PPK drones give you better results than GCPs?", https://www.pix4d.com/blog/why-ground-control-points-important, Aug. 26, 2017, Publisher: PIX4D.

Rankin et al., "Daytime Mud Detection for Unmanned Ground Vehicle Autonomous Navigation", , pp. 1-9, Publisher: Jet Propulsion Laboratory, California Institute of Technology.

Reid, "Precision Guidance of Agricultural Vehicles", 1998, pp. 1-10.

Rovira-Mas et al., "Stereo vision three-dimensional terrain maps for precision agriculture", computers and electronics in agriculture, 2008, pp. 133-143, Publisher: ScienceDirect.

Saarinen et al., "3D Normal Distributions Transform Occupancy Maps: an Efficient Representation for Mapping in Dynamic Environments", Mapping in 3D Environments, , pp. 1-24.

Subramanian et al., "Development of machine vision and laser radar based autonomous vehicle guidance systems for citrus grove navigation", Computers and Electronics in Agriculture, 2006, pp. 130-143, No. 53, Publisher: ScienceDirect.

"Top Air Steerable Hitch", Unverferth Mfg. Co., Inc.

Raven Precision, "Viper 4+ and Job Sync", Aug. 7, 2018, Youtube.

Barry et al., "Accuracy of UAV Photogrammetry Compared With Network RTK GPS", , Publisher: Baseline Surveys Ltd, Published in: IE.

Bruns, "Thesis—Lidar-based Vehicle Localization in an Autonomous Valet Parking Scenario", 2016, Publisher: The Ohio State University.

Cho et al., "Autonomous speed sprayer guidance using machine vision and fuzzy logic", 1999, pp. 1137-1143, vol. 42, No. 4, Publisher: Transactions of the ASAE.

"Machine Sync Activation", https://www.deere.com/en/technology-products/precision-ag-technology/guidance/machine-sync/, , Publisher: John Deere US.

English et al., "Vision Based Guidance for Robot Navigation in Agriculture".

Im et al., "Parking Line Based SLAM Approach Using AVM/LiDAR Sensor Fusion for Rapid and Accurate Loop Closing and Parking Space Detection", Sensors, Nov. 5, 2019, pp. 1-17, Publisher: MDPI.

Leonard et al., "Dynamic Map Building for an Autonomous Mobile Robot", Aug. 1992, p. 4, No. 11, Publisher: The International Journal of Robotics.

Muller Elektronik GMBH & Co. KG, "Installation and Operating Instructions Trail-Control Manufacturer", Mar. 2001, Published in: Germany.

Muller-Elektronik GMBH & Co.KG, "Hardi Auto-Track Instruction Book", Jan. 10, 1996, Published in: Germany.

Muller Elektronik, "Installation and Users Guide TRAIL-Control II", Sep. 1, 2010, Published in: DE.

"Ground control points: why are they important?", https://www.pix4d.com/blog/why-ground-control-points-important, Dec. 3, 2019, Publisher: PIX4D.

Agjunction—Wheelman Flex Installation Guide, Fit Kit: 810-0036-01.

CHCNAV—ANX510 SE AutoSteer.

FJDynamics—GPS Guidance Auto Steer System for Tractor.

FJDynamics—Navigate to Next-level Efficiency—FJD AT2 Auto Steer System.

John Deere—Auto Trac Universal (ATU) Steering Kit, 2007.

John Deere—Precision Ag Technology—AutoTrac Universal 300.

Orthman—Steerable guidance coulters—Tracker IV.

Protracker Guidance Systems—300DB Hydraulic Hitch Specifications.

Raven Industries—Direcsteer, available as early as 2023.

Raven Industries—SmartTrax MD Installation Manual, 2013.

Raven Cart Automation—https://www.ravenind.com/products/autonomy/raven-cart-automation, UNKNOWN—available as early as 2024.

Trimble—EZ-Pilot Pro Guidance System, 2018.

Trimble—EZ-Steer System, 2010.

Wei Jiang, Zhuojian Cao, Baigen Cai, Binghao Li, and Jian Wang. Indoor and outdoor seamless po-sitioning method using uwb enhanced multi-sensor tightly-coupled integration. IEEE Transactions on Vehicular Technology, 70 (10): 10633-10645, 2021.

Yu Xianjia, Li Qingqing, Jorge Pena Queralta, Jukka Heikkonen, and Tomi Westerlund. Cooperative uwb-based localization for outdoors positioning and nav-igation of uavs aided by ground robots. In 2021 IEEE International Conference on Autonomous Systems (ICAS), pp. 1-5. IEEE, 2021.

Ag Leader Technology—OnTrac3 Operators Manual PN2006236-ENG Rev. B, 2014.

Case IH Active Implement Guidance—https://www.youtube.com/watch?v=Kb059Tj1Q_k.

Ehab Ghanem, Kyle O'Keefe, and Richard Klukas. Testing vehicle-to-vehicle relative position and at-titude estimation using multiple uwb ranging. In 2020 IEEE 92nd Vehicular Technology Conference (VTC2020-Fall), pp. 1-5. IEEE, 2020.

SUNCO Farm Equipment—Pull Implement Guidance.

John Deere FarmSight—Active Implement Guidance, UNKNOWN—available as early as 2013—https://www.youtube.com/watch?v=JqBM1hH_MBs.

Orthman—Tracker implement guidance—Date Unknown available as early as 2012—https://www.facebook.com/orthmanag/videos/tracker-implement-guidance/3057072390855/.

Anand et al., "AgriSegNet: Deep Aerial Semantic Segmentation Framework for IoT-Assisted Precision Agriculture", IEEE Sensors Journal, 2021, pp. 17581-17590, vol. 21, No. 16.

Bhagat et al., "MS-Net: A CNN Architecture for Agriculture Pattern Segmentation in Aerial Images", 2022, Publisher: Cham: Springer International Publishing.

Imai et al., "Shadow detection in hyperspectral images acquired by UAV", The International Archives of Photogrammetry, Remote Sensing and Spatial Information Sciences, 2019, pp. 371-377.

Innani et al., "Fuse-pn: A novel architecture for anomaly pattern segmentation in aerial agricultural images", 2021.

Shrestha et al., "Automatic Corn Plant Population Measurement Using Machine Vision", Agricultural and Biosystems Engineering Conference Proceedings and Presentations., 2001, No. 37.

Shrestha et al., "Shape and Size Analysis of Corn Plant Canopies for Plant Population and Spacing Sensing", 2005, pp. 295-303.

Tang et al., "Plant Identification in Mosaicked Crop Row Images for Automatic Emerged Corn Plant Spacing Measurement", 2008, pp. 2181-2191.

Thorp et al., "Using Aerial Hyperspectral Remote Sensing Imagery to Estimate Corn Plant Stand Density", 2008, pp. 311-320.

Wolters, D., "Assessment of Corn Plant Population at Emergence from Processed Color Aerial Imagery", 2015.

AutoFarm—OnTrac2, Date Unknown available as early as 2009, https://www.farmprogress.com/farming-equipment/autofarm-introduces-ontrac2-gps-assisted-steering-system.

Novariant—Ontrac2+, Date Unknown available as early as 2012.

Protracker Guidance Systems—400DB Hydraulic Hitch Specifications, Date Unknown available as early as 2012.

Ashley Napier, Paul Newman, "Generation and Exploitation of Local Orthographic Imagery for Road Vehicle Localisation", 2012, 2012 IEEE Intelligent Vehicles Sysmposium, pp. 590-596, DOI: 10.1109/IVS.2012.6232165.

GameMaker Community—https://forum.gamemaker.io/index.php?threads/sprite-real-time-multi-recoloring-using-shaders.12601, 2016.

\* cited by examiner

APPARATUS, SYSTEMS AND METHODS FOR AUTOMATED NAVIGATION OF AGRICULTURAL EQUIPMENT

CROSS-REFERENCE TO RELATED APPLICATION(S)

This application claims priority to U.S. Provisional Application No. 62/878,553 filed Jul. 25, 2019 and entitled "Apparatus, Systems And Methods For Automated Navigation Of Agricultural Equipment," which is hereby incorporated by reference in its entirety under 35 U.S.C. § 119(e).

TECHNICAL FIELD

The disclosed apparatus, systems and methods relate to an automated navigation system to be utilized with agricultural equipment.

BACKGROUND

This disclosure relates to the apparatus, systems, and methods for an automated navigation system to be used with agricultural equipment. Precise navigation of agricultural equipment, including but not limited to grain carts, is difficult and requires significant skill. There are few operators that have the requisite experience and even those experienced operators experience substantial fatigue while doing their jobs. The disclosed systems, devices and methods reduce the skill level required to precisely operate equipment and decrease fatigue for already skilled operators by relieving the operator from steering tasks.

There is a need in the art for improved systems for automated navigation systems to be used with agricultural equipment such as, but not limited to, grain carts, allowing for the unloading of grain or other material.

BRIEF SUMMARY

Discussed herein are various embodiment of automated navigation systems to be used with agricultural equipment.

In the various Examples described in detail here and throughout the disclosure, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In Example 1, a guidance path generation system for a following agricultural vehicle with an operations unit and display or automatic steering system, the guidance path generation system comprising software executed on the operations unit configured to receive vehicle path data, generate follow guidance paths, and output the generated follow guidance paths for visualization on the display or commanding the automatic steering unit.

In Example 2, the system of Example 1, wherein the vehicle path data comprises leading vehicle data.

In Example 3, the system of Example 2, wherein the leading vehicle data comprises leading vehicle swath data.

In Example 4, the system of Example 3, wherein the guidance path is generated by applying an offset to the leading vehicle swath data.

In Example 5, the system of Example 4, wherein the vehicle path data comprises following vehicle data.

In Example 6, the system of Example 5, wherein the vehicle path data comprises leading characteristic data and following characteristic data.

In Example 7, the system of Example 1, wherein the software executed on the operations unit configured generating guidance paths is configured to establish leading vehicle swath and heading, and apply an offset.

In Example 8, a follow vehicle guidance path system, for a following agricultural vehicle with an operations unit and display or automatic steering system, the guidance path generation system comprising software executed on the operations unit configured to receive vehicle path data, generate follow guidance paths via establishing leading vehicle swath and heading and applying an offset, and output the generated follow guidance paths for visualization on the display or commanding the automatic steering unit.

In Example 9, the system of Example 8, wherein the vehicle path data comprises leading vehicle data comprising leading vehicle location data, and leading vehicle swath data.

In Example 10, the system of Example 8, wherein the vehicle path data comprises leading characteristic data and following characteristic data.

In Example 11, the system of Example 8, wherein the vehicle path data comprises user input data.

In Example 12, the system of Example 8, wherein the guidance paths generation further comprises establishing swath center and/or establishing swath edge.

In Example 13, the system of Example 8, wherein the software is configured to gap fill and/or curve smooth.

In Example 14, the system of Example 8, wherein the software is configured to adjust the guidance paths for roll, pitch or yaw.

In Example 15, the system of Example 8, wherein the software is configured to predict collision points and issue collision warnings.

In Example 16, a follow vehicle guidance path system, for a following agricultural vehicle with an operations unit and display or automatic steering system, the guidance path generation system comprising software executed on the operations unit configured to generate follow guidance paths via establishing leading vehicle swath and heading and applying an offset to the leading vehicle swath and heading, and output the generated follow guidance paths for visualization on the display and command the automatic steering unit.

In Example 17, the system of Example 16, further comprising an enterprise system.

In Example 18, the system of Example 16, further comprising a counter reset system constructed and arranged to reset a grain tank counter.

In Example 19, the system of Example 16, further comprising a collision alert system.

In Example 20, the system of Example 16 configured to store guidance path data.

Other embodiments of these Examples include corresponding computer systems, apparatus, and computer programs recorded on one or more computer storage devices, each configured to perform the actions of the methods. Implementations of the described techniques may include hardware, a method or process, or computer software on a computer-accessible medium. While multiple embodiments are disclosed, still other embodiments of the disclosed devices, systems and methods will become apparent to those skilled in the art from the following detailed description, which shows and describes illustrative embodiments of the disclosed devices, systems and methods. As will be realized, the disclosed devices, systems and methods are capable of modifications in various obvious aspects, all without departing from the spirit and scope of the disclosed devices, systems and methods. Accordingly, the drawings and detailed description are to be regarded as illustrative in nature and not restrictive.

BRIEF DESCRIPTION OF THE DRAWINGS

FIG. 2 is a depiction of an operations system inside the cab of an agricultural implement, according to one implementation.

DETAILED DESCRIPTION

The various embodiments disclosed or contemplated herein relate to devices, methods, and design principles used to generate guidance paths for a secondary operation in real time. More specifically, the implementations relate to an automated navigation system for use with agricultural equipment, particularly grain carts. In various implementations, the use of previously-logged harvest data by a first piece of equipment, such as a combine, are used in establishing a guidance path for a secondary piece of equipment, such as a tractor pulling a grain cart. That is, in various implementations, the system allows for the proper alignment of the grain cart with the combine for the receipt of grain on the basis of the known previous locations of the combine. While the primary application of this automated navigation system is use with grain carts, one skilled in the art will recognize that this system can be applied to other agricultural equipment. Various implementations can utilize stored guidance paths and/or harvest maps for subsequent path guidance.

In exemplary implementations of the disclosed follow vehicle path system 10 discussed herein, vehicle path data includes a harvest map plotting the swaths of a leading vehicle (shown at box 220 in FIG. 1D) such as a combine is used to generate optimized guidance paths for a following vehicle, such as a tractor with grain cart for use in collecting grain or other material from a leading vehicle in a subsequent pass. The system 10 represents a technological improvement in that it facilitates, for example, the optimum path alignment of a following vehicle such as a grain cart with a leading vehicle such as a combine by utilizing leading vehicle path data collected about the previous position of the combine in the field.

Figure 1A:
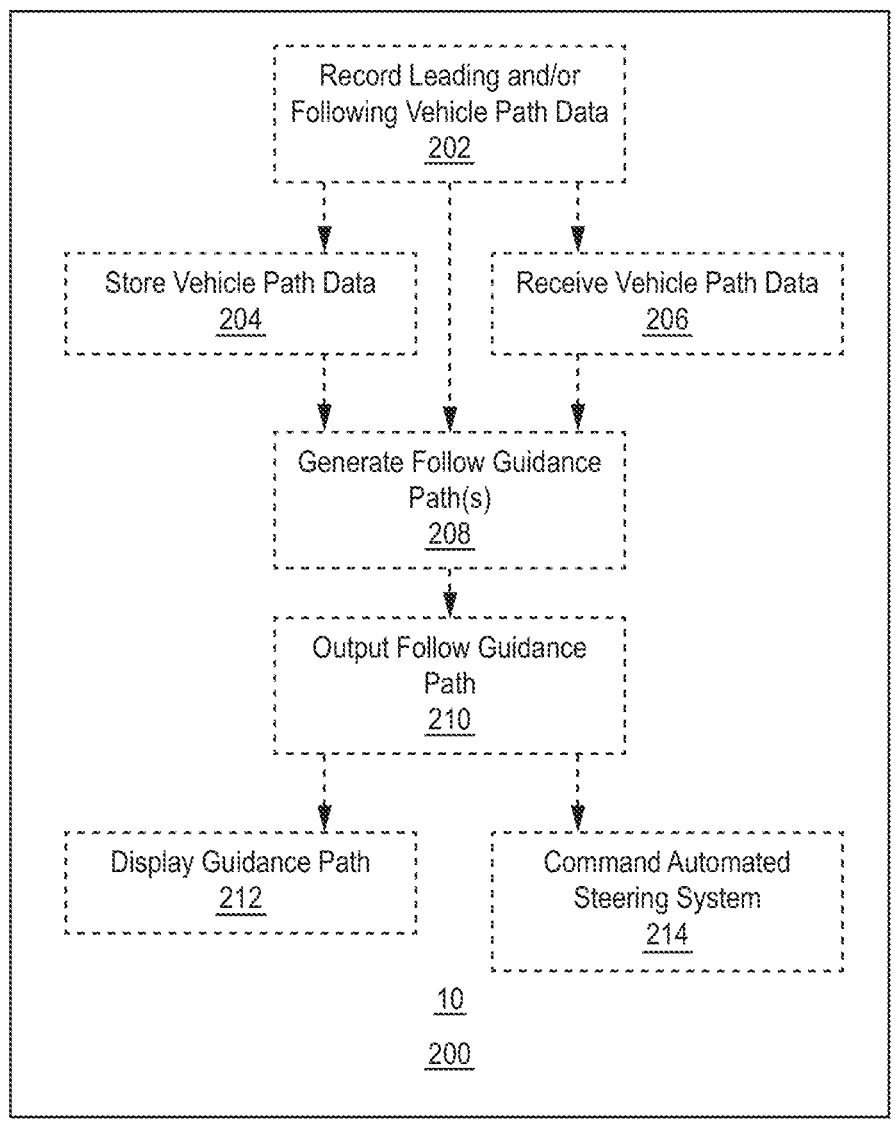
FIG. 1A is a schematic overview of a model process executed by the follow vehicle path system, according to one implementation.
Figure 1B:
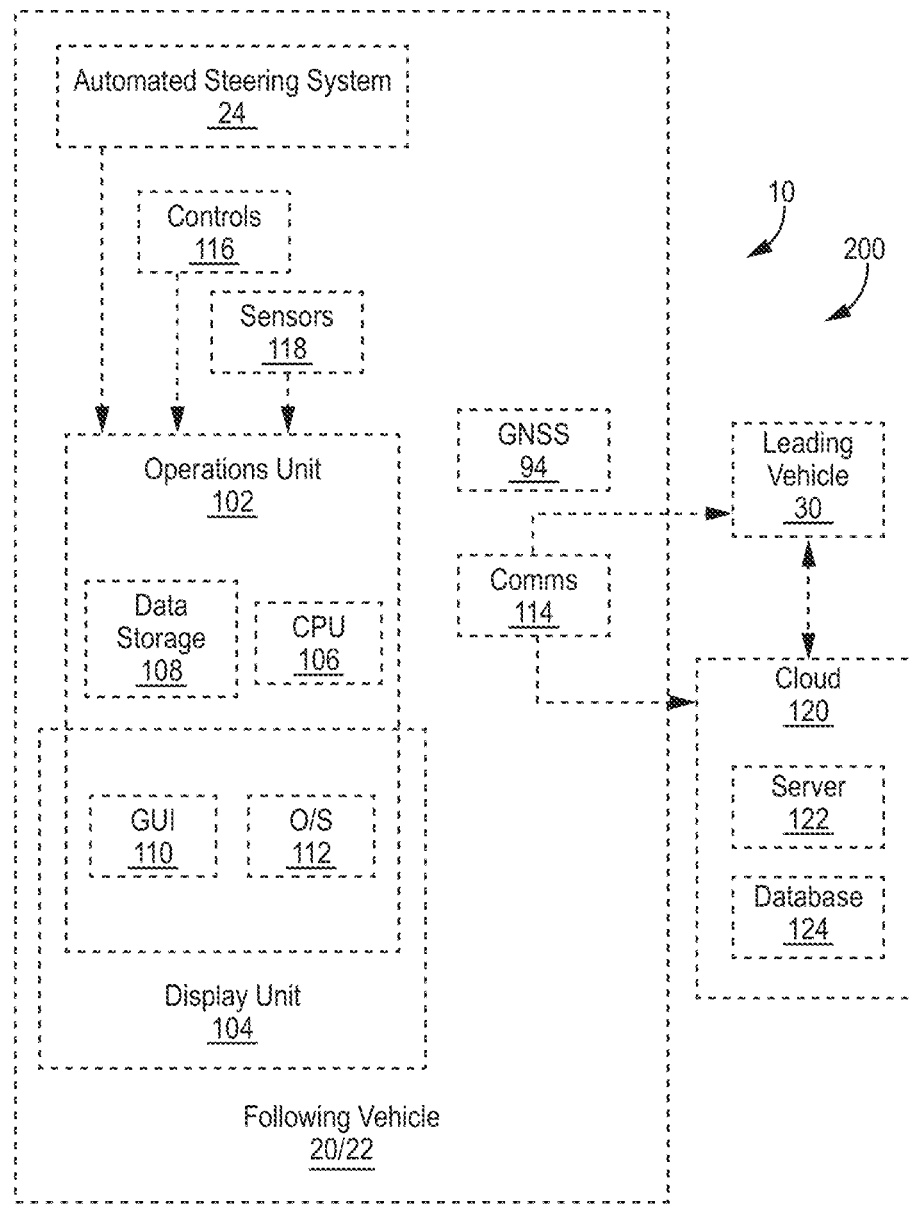
FIG. 1B is a schematic overview of various components utilized by the follow vehicle path system, according to one implementation.
Figure 1C:
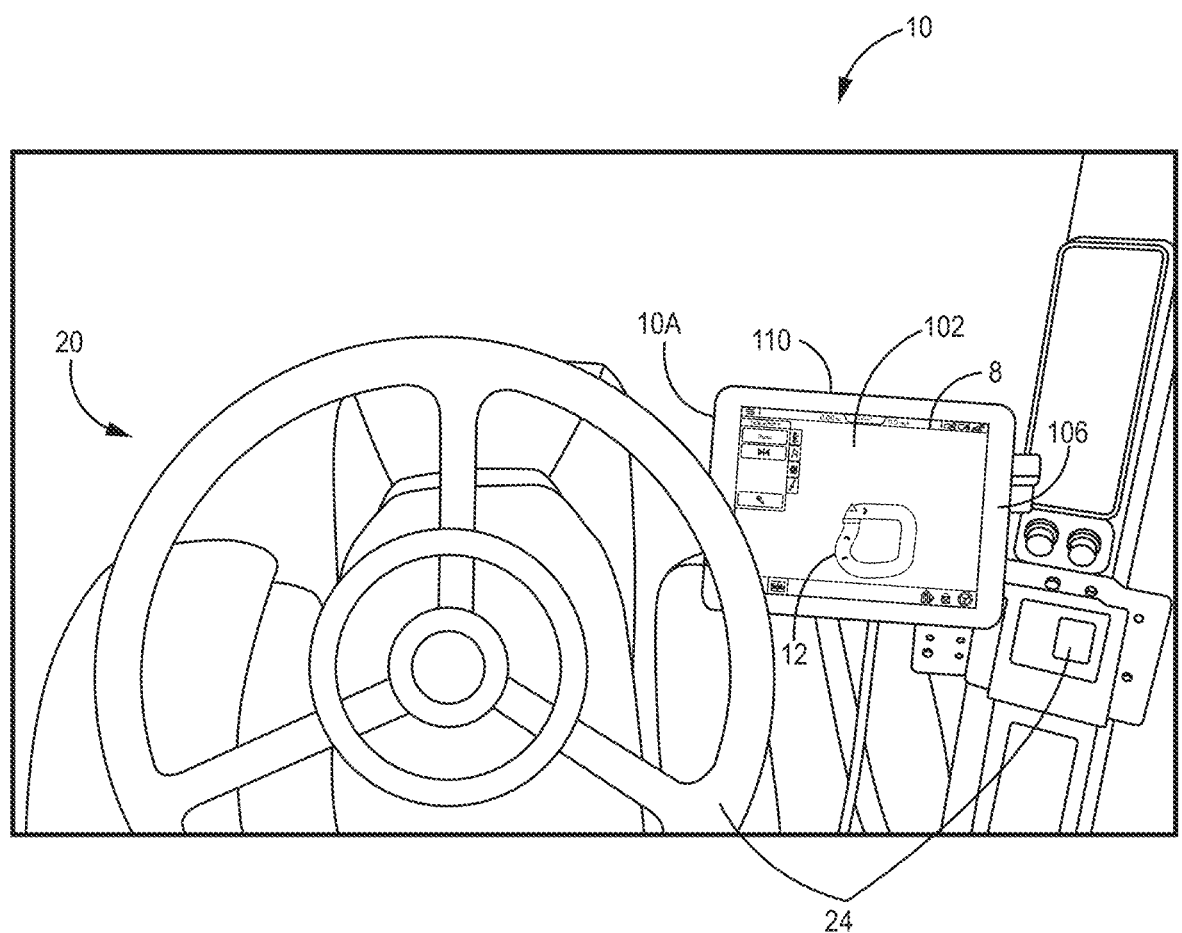
FIG. 1C is an in-cab view of various components utilized by the follow vehicle path system, according to one implementation.
Figure 1D:
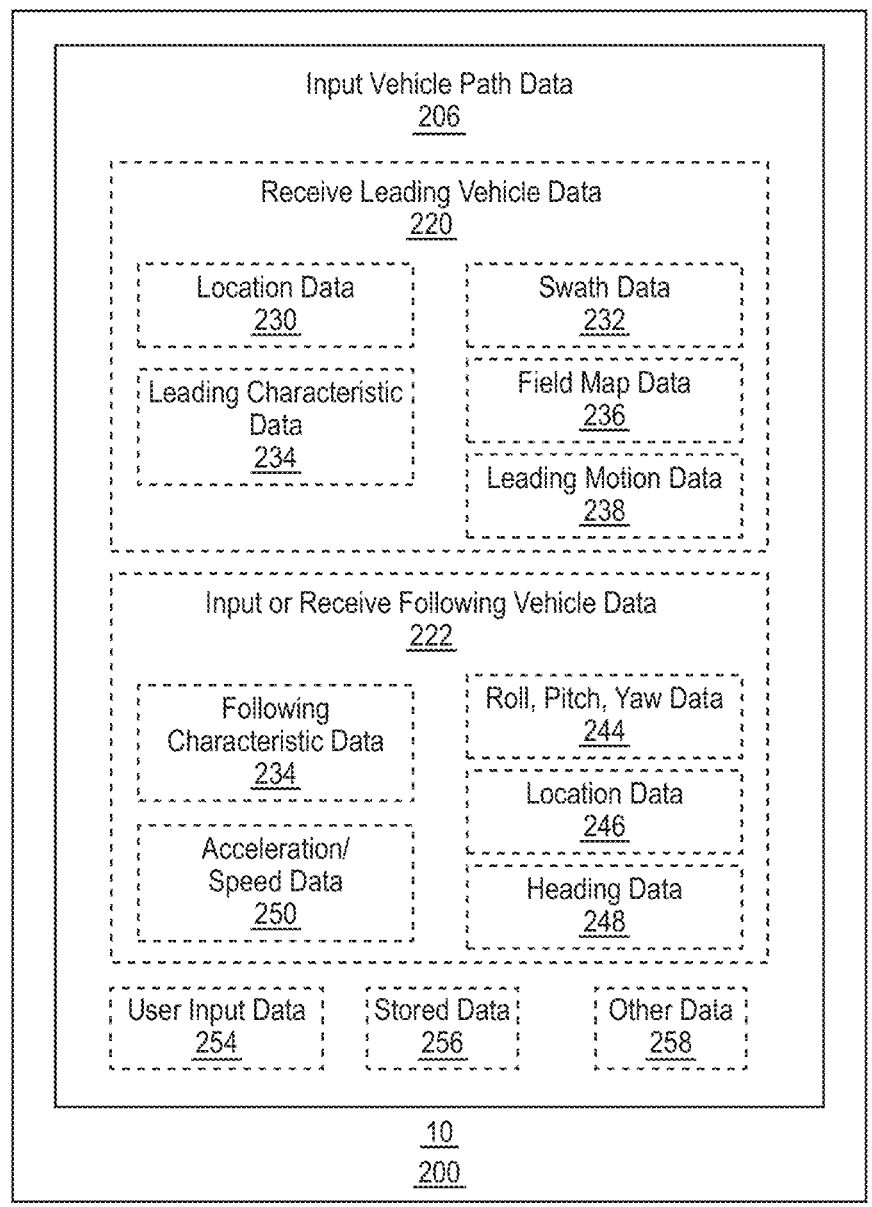
FIG. 1D is a detailed schematic overview of a model process executed by the follow vehicle path system, according to one implementation.

In certain implementations, the vehicle path data also includes various combinations of stored, recorded, plotted and/or sensed data by the following vehicle, as well as defined constants and user inputs, as would be readily appreciated to those of skill in the art from the present disclosure, as is also discussed in relation to FIG. 1D.

In alternate implementations, the system 10 generates one or more following vehicle guidance paths 12 from the recorded leading vehicle data and/or any other stored leading or following vehicle data including sensor data and user inputs.

It is appreciated that the leading vehicle in the disclosed implementations can be any vehicle that has performed an agricultural operations, and in various implementations, the leading vehicle utilized for generating following vehicle guidance paths and the leading vehicle to be aligned with by the following vehicle may not be the same vehicle, as would be understood in accordance with the below discussion.

Turning to the drawings in greater detail, various implementations of the follow vehicle path system 10 in use are shown throughout. In certain of these implementations, a following vehicle, such as a grain cart tractor is generally able to utilize leading vehicle data from another vehicle: a leading vehicle such as a combine—optionally combined with or including sensor data—to generate a guidance path for use with a display and or automatic steering system to optimize the efficiency of and accuracy of the vehicle aligning with the other vehicle.

FIG. 1A depicts an overall schematic of one software executed process 200 implementation of the system 10 comprising a variety of optional steps and sub-steps automating guidance path generation and execution. For example, in various implementations the system 10 collects vehicle data relating to the location, heading and swath of the leading vehicle and other data to establish the guidance path for the following vehicle as discussed herein.

As such and as shown in FIG. 1A, in various implementations of the follow vehicle path system 10 and software executed process 200, according to one optional step, vehicle path data from the leading and/or following vehicle is recorded (box 202). In exemplary implementations, this recorded vehicle path data includes one or more of the location, heading and swath width of the leading vehicle.

In various implementations and as discussed herein, the vehicle path data can be recorded by a leading vehicle such as a combine about the field and/or leading vehicle swath from the guidance system or other digital and navigational components utilized by the vehicle as well as defined constants such as swath size. Vehicle path data can also be derived from the following vehicle (grain cart tractor), user inputs, various databases and other sources, as discussed below. It is appreciated that while reference is made herein to a combine as the leading vehicle, other leading vehicles such as planters, sprayers, fertilizer applicators, field drainage vehicles and the like are of course possible. Further, it will be readily appreciated that various aspects of the system 10 described herein are implemented via either the leading or following vehicle.

Importantly, it is also appreciated that the timescale between the recording of any vehicle path data and the output of guidance paths can range from milliseconds or less in the case of contemporaneous operations to days, weeks, months, seasons or year-over-year in the case of stored vehicle path data from, for example, a planter being used as the leading vehicle for a combine being the following vehicle at harvest time.

Further, as used herein, vehicle path data can include data about the leading vehicle and/or following vehicle and their guidance, such as but not limited to the speed, heading, swath width row position and shape and other factors, as well as information about the field, such as the boundaries, regions and obstacles, as would be readily appreciated by those of skill in the art from the present disclosure. In various implementations discussed herein, the vehicle path data is rendered as a map, including digital maps such as harvest maps showing guidance that are displayed on the various display components disclosed herein.

Continuing with FIG. 1A, in various implementations, in another optional step, vehicle path data is optionally stored (box 204) for use by the system 10. It is again appreciated that such storage can range from long-term data storage, such as in the cloud, or very short term storage on readable media within an operations unit simply for the purpose of immediate processing, such as via RAM being implemented on the leading or following vehicle. For example, in certain implementations of the system 10, vehicle path data generated by the combine is stored in a cloud 120 server 122 and/or database 124, as shown in FIG. 1B. For example, in implementations where the vehicle path data is drawn from a planter, the vehicle path data may be stored from planting to harvest or between seasons, as discussed herein in relation to FIG. 10, while in alternate implementations, vehicle path data is stored locally on the leading and/or following vehicle for immediate, optionally transitory use, as would be appreciated.

Continuing with FIG. 1A, in various implementations, in another optional step, vehicle path data and/or sensor data is received (box 206) into, for example, an operations unit (as discussed in relation to FIG. 1D) for use by the system 10. Again, in various implementations, the vehicle path data is received from one or more of the other vehicle, such as the combine; the executing vehicle sensors (shown in FIG. 1B at 118); the cloud (shown in FIG. 1B at 120) or other sources or databases; user inputs and other sources as will be described further in FIGS. 2A-8. For clarity, it is appreciated that such received vehicle path data can include the various user inputs described herein.

Continuing further with FIG. 1A, in another optional step according to certain implementations, the follow vehicle path system 10 generates a follow guidance path (box 208) by processing the various types of vehicle path data as illustrated in detail in FIGS. 2A-8. In various implementations, the system formulates or utilizes an offset to generate the follow vehicle guidance path (box 208), as described elsewhere in detail. In certain implementations, stored leading vehicle swath data is utilized.

As also shown in FIG. 1A, after generating the follow guidance path (box 208), in another optional step according to certain implementations, the follow guidance path is outputted for use/engagement. That is, for example, in various implementations the guidance path is outputted to, for example, a display (box 212, shown in FIG. 1B at 104) and/or to command an automatic steering unit (box 214, shown in FIG. 1B at 24). In further implementations, the generated guidance path is stored, such as in a cloud 120 server 122 and/or database 124, as shown in FIG. 1B.

Figure 10:
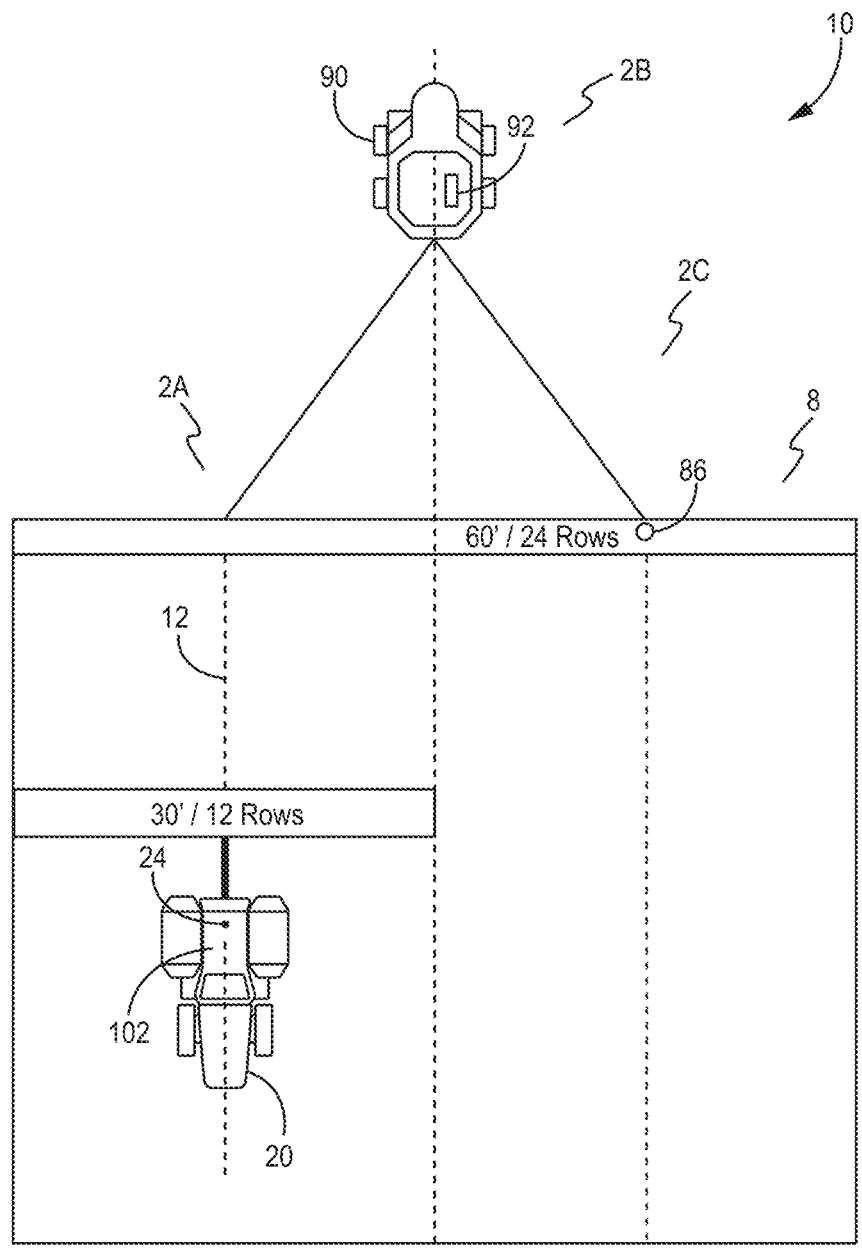
FIG. 10 is a schematic depicting the use of a collected planting map in a subsequent harvest operation, according to one implementation.

Turning to FIG. 1B in earnest and FIG. 1C, in facilitating the generation of the guidance path and user control, it is understood that in various implementations the system 10 comprises various components constructed and arranged to execute the various aspects of the system 10 discussed herein. In the exemplary implementation of FIG. 1B, the following vehicle (such as a tractor 20/grain cart 22 shown variously in FIGS. 2A-7) comprises is an operations unit 102 on comprising one or more optional components, for example a display 104, a processor 106, storage media 108, a graphical user interface (GUI) 110 and/or an operating system 112 configured to implement the system 10 and the described implementations of the software executed processes 200 in the generation of the guidance paths described herein, as would be readily appreciated. It is understood that while the operations unit 102 can be disposed in an agricultural implement cab, as shown in FIG. 10.

Continuing with FIGS. 1B-1C, in various implementations, the operations unit 102 can be interconnected or otherwise in electronic communication with the automatic steering system 24, such as SteerCommand®, communications unit(s) 114, vehicle controls 116, GNSS 94 and other sensors 118 discussed herein, which in turn may be located throughout the tractor 20 and/or grain cart 22, as would be appreciated. It is appreciated that the various optional system components are in operational communication with one another via wired or wireless connections and are configured to perform the processes and execute the commands described herein. It is further appreciated that each of these components is of course optional and would be readily understood in the art.

It is understood that the communications unit(s) 114 can operate wirelessly via understood internet and/or cellular technologies such as Bluetooth, WiFi, LTE, 3G, 4G, or 5G connections and the like. It is understood that in certain implementations, the communications unit 114 and/or cloud 120 components comprise encryption or other data privacy components such as hardware, software, and/or firmware security aspects. In various implementations, the operator or enterprise manager or other third parties are able to receive notifications such as adjustment prompts and confirmation screens on their mobile devices, and in certain implementations can review the plotted guidance paths and make adjustments via their mobile phones.

As also shown in FIGS. 1B-1C, in various implementations some of the components discussed herein may be housed in the display unit 104 or other of the components, as would be appreciated. In certain implementations, the display 104/GUI 110 comprises a touchscreen. In various implementations, the display unit 104 is an InCommand® display unit 104, or other similar, suitable display unit 104 understood in the art. It is appreciated that certain of these displays 104 feature touchscreens, while others are equipped with necessary components for interaction with the various prompts and adjustments discussed herein, such as via a keyboard or other interface.

As shown in the implementation of FIG. 10, the display unit 104 is interconnected with various components inside the cab of the following vehicle 20, which in this implementation is a tractor 20 pulling a grain cart. As shown in FIG. 1C, the display unit 104 is constructed and arranged to depict vehicle path data 8 and follow guidance paths 12 via the GUI 110. Many alternate implementations are of course possible.

Turning to FIG. 1D, various implementations of the optional data input step (box 206) can feature several sub-steps and aspects. It is readily appreciated that each of these aspects or sub-steps is optional and can be omitted and can be performed in any order. Focusing on the various aspects of FIG. 1D in detail, the inputted data is generally described in relation to leading vehicle data (box 220) and/or following vehicle data (box 222) as well as user input data (box 254), stored data (box 256) such as stored vehicle path data 8 such as planting or harvest maps (shown generally at 100) and other data relating to the leading or following vehicle as well as other data (box 258) that would be apparent to those of skill in the art. That is, it is understood to include all data discussed or contemplated throughout the detailed description and incorporated references or as would be understood by those of skill in the art.

As shown in FIG. 1D, in various implementations the system 10 receives vehicle path data comprising location data (box 230) relating to the position of a leading vehicle (such as a combine) in the field. That is, in various implementations, location data relating to the combine position is utilized by the system 10 software executed process 200 as leading vehicle path data 220 to establish the guidance path as discussed below.

As is also shown in FIG. 1D, prior swath data (box 232), such as the locations of the edges of the swaths and the width of the swaths from the prior vehicle, be it a combine, planter or other leading vehicle, is utilized by the system 10 software executed process 200 as vehicle path data 8, box 206 to establish the guidance path for the following vehicle. Further, leading vehicle characteristics (box 234) such as defined widths is optionally utilized as leading vehicle data (box 220) according to certain implementations.

In certain optional implementations, the system 10 receives field map data (box 236), such as field map boundaries and geographic characteristics are utilized by the system 10. Other field characteristics that may be received are detailed for example in co-pending U.S. application Ser. No. 16/921,828 which is incorporated by reference in its entirety.

Continuing with FIG. 1D, in certain implementations the system 10 optionally receives data relating to the motion of a leading vehicle (box 238), such as heading or direction, speed and other characteristics relating to the motion of the leading vehicle 30 as would be readily appreciated. It is appreciated that each of these sub-steps is illustrative of certain categories of leading vehicle data that can be received by the system 10 according to certain implementations as is illustrated in the forthcoming exemplary implementations, but those of skill in the art would readily appreciate that additional aspects and sub-steps are of course contemplated.

Additionally, further inputs into the system 10 can be received via sensors or other components, as shown generally at box 222. That is, in various implementations, following vehicle characteristic data (box 240) such as following vehicle size and type; following vehicle roll, pitch and yaw data (box 244); following vehicle location data (box 246); following vehicle heading data (box 248); following vehicle motion/acceleration/speed data (box 250) and other following vehicle data can be received by the system 10 from sensors or otherwise for use in generating the guidance path as vehicle path data and/or for generating guidance paths, as described below. Other data (box 258) such as safety data can likewise be received, as discussed below in relation to FIGS. 7A-B and as would be readily appreciated.

Figure 1E:
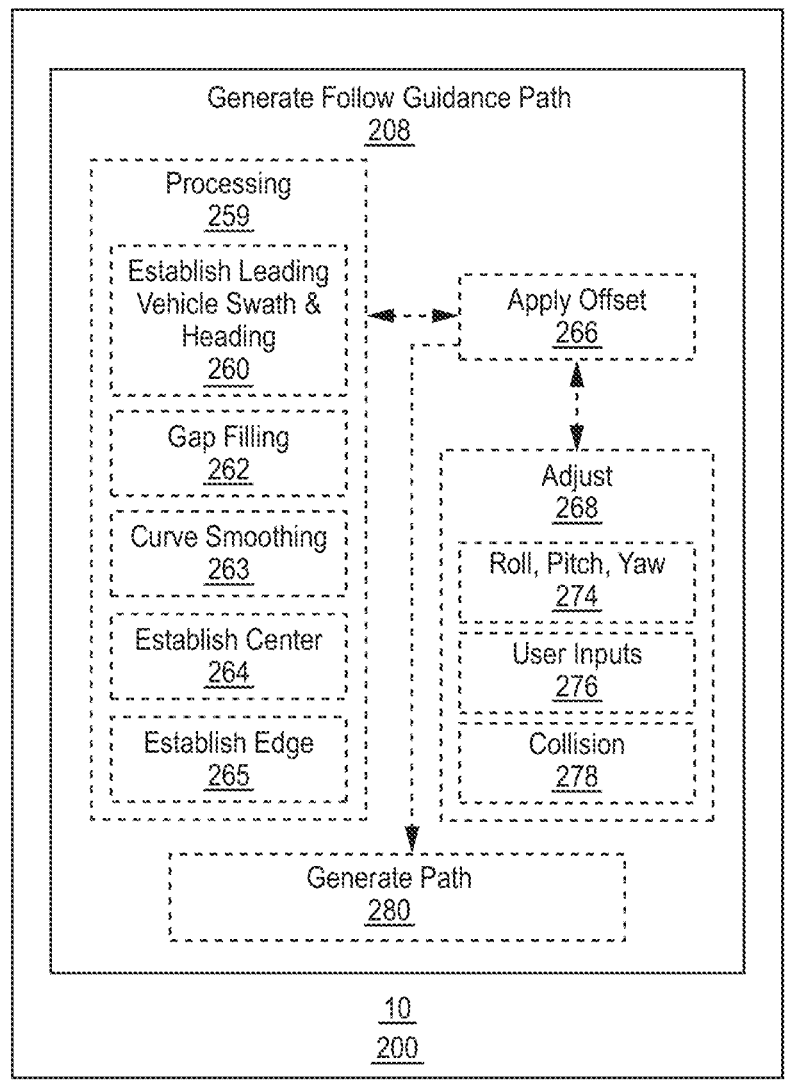
FIG. 1E is a further detailed schematic overview of a model process executed by the follow vehicle path system, according to one implementation.

As shown in FIG. 1E, the system 10 according to certain implementations is constructed and arranged to execute an optional step of generating a follow guidance path (box 208) according to certain software executed process 200 implementations. In some of these implementations, and as discussed below in relation to FIGS. 2A-2B, the system 10 processes vehicle path data to generate one or more guidance paths (box 280).

Various optional sub-steps can be utilized in guidance path generation, including several adjustment sub-steps shown generally at box 268. One of skill in the art will readily appreciate that the various steps and sub-steps can be included or omitted, as well as be performed consecutively, concurrently, in any order or iteratively.

Various implementations feature one or more processing sub-steps shown at box 259 that can be implemented on via the software executed process on the vehicle path data, according to certain implementations. Further processing is of course possible.

Figure 2A:
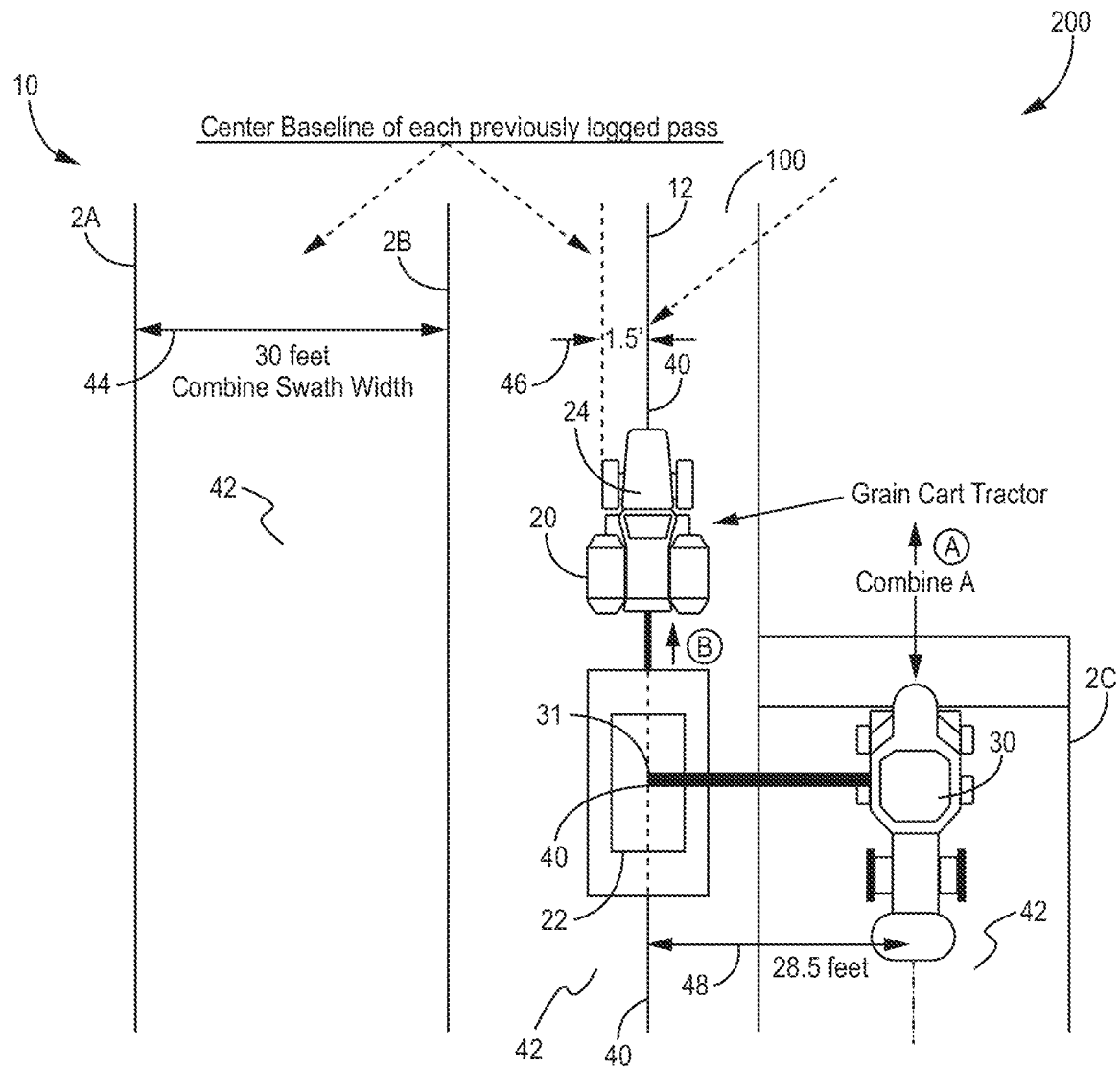
FIG. 2A is a schematic depicting one example of the follow vehicle path system in use, according to one implementation.
Figure 2B:
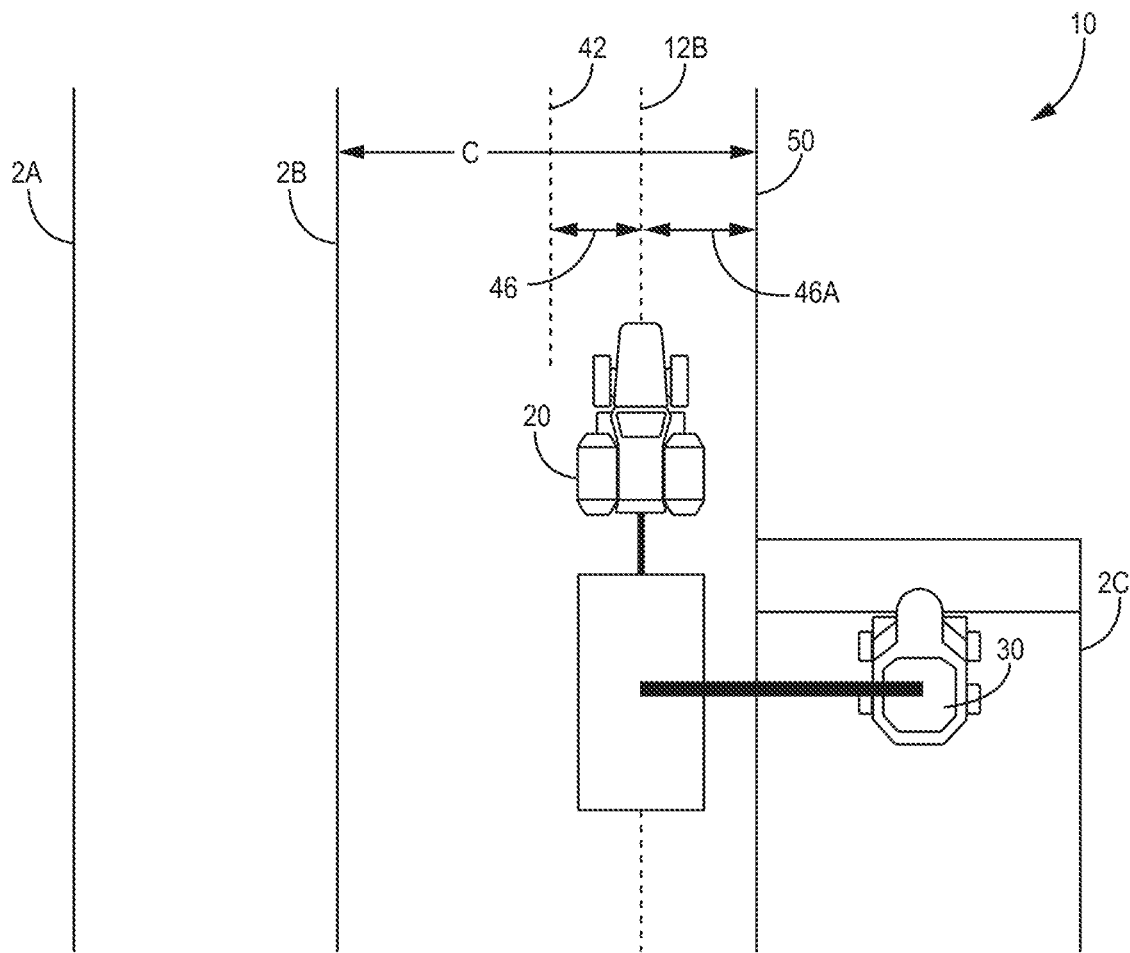
FIG. 2B is a schematic depicting one example of the follow vehicle path system in use, according to one implementation.

In an optional sub-step, the system 10 and software executed process 200 are constructed and arranged to process vehicle path data to establish leading vehicle swath positions and headings (box 260), as described in detail in FIGS. 2A-2B and elsewhere.

Figure 5:
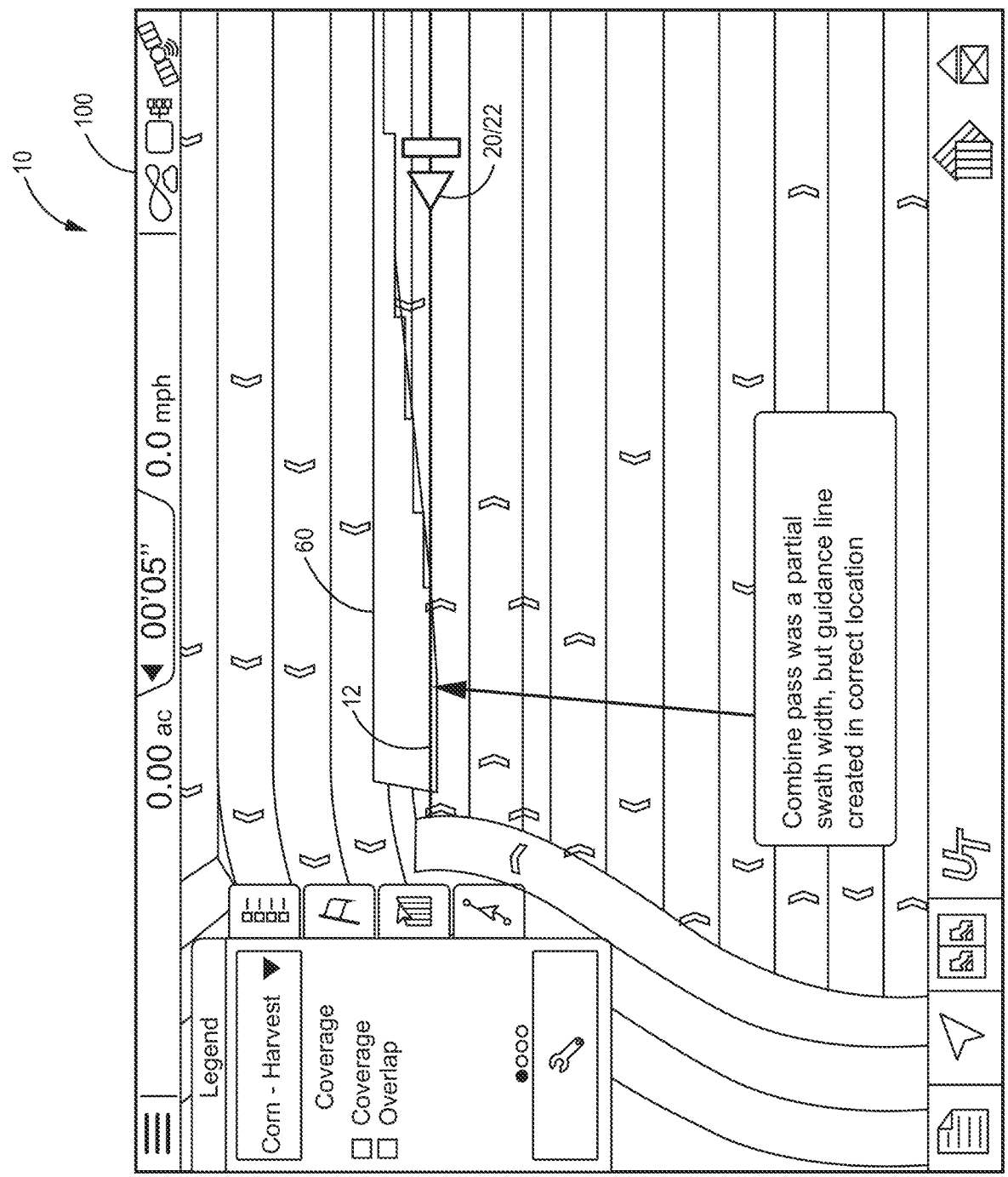
FIG. 5 is a view of the graphical user interface showing partial swaths, according to one implementation of the follow vehicle path system.
Figure 6:
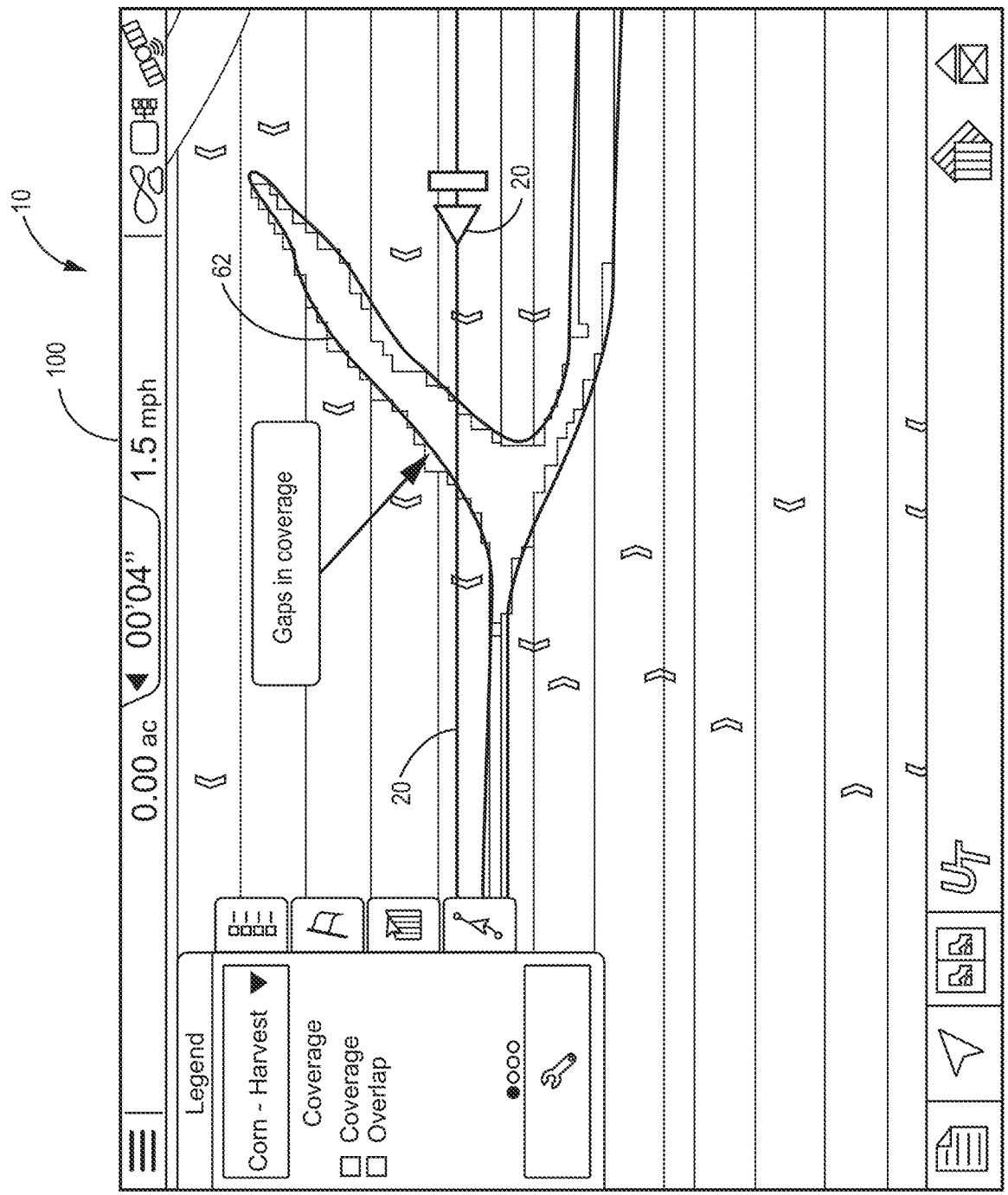
FIG. 6 is a view of the graphical user interface showing gaps in the harvest map, according to one implementation of the follow vehicle path system.

In an optional sub-step, the system 10 and software executed process 200 are constructed and arranged to fill any gaps (box 262) in the vehicle path data/established leading vehicle positions/headings via processing, as discussed for example in relation to FIGS. 5-6.

In an optional sub-step, the system 10 and software executed process 200 are constructed and arranged to perform curve smoothing (box 263) processing in the leading vehicle path data/established leading vehicle positions/headings. That is, if the received swath data has oscillations or other variations in it, for example because the leading vehicle was manually driven, or the steering system was not properly tuned, the following vehicle (grain cart 22/tractor 20) would follow a corresponding oscillating path as well. To address this issue, in implementations of the system 10 featuring curve smoothing (box 263), the system utilizes a smoothing factor to reduce line noise. It is understood that many known mathematical operations can accomplish line smoothing within the overall established parameters of the system. In certain implementations, the smoothing can be applied according to user inputs, such as low, medium and high smoothing, as would be readily understood.

In another optional sub-step, the system 10 and software executed process 200 are constructed and arranged to establish one or more swath centers (box 264) and/or edge (box 265) in the vehicle path data, as discussed for example in relation to FIGS. 2A-4.

As described in detail herein, in another optional sub-step according to exemplary implementations, the system 10 and software executed process 200 are configured to calculate and/or apply an offset (box 266) from the relevant swath center and/or edge to plot or otherwise generate a path (box 280) for the following vehicle, as also discussed for example in relation to FIGS. 2A-4. It is appreciated that the offset utilized by the system 10 can be revised and recalculated on the basis of the vehicle path data/processed vehicle path data and other adjustments (for example at box 268) discussed herein in generating the path (box 280).

It is further appreciated that many of these steps and sub-steps are performed in real-time and in various orders, such that the system 10/software executed process 200 is generating the follow guidance path in a sequence, such that in certain sequences various of these sub-steps are performed when, for example, a gap arises, and are not performed in the absence of a gap, as would be readily appreciated.

In a further optional set of one or more sub-steps, the system 10 and software executed process 200 are constructed and arranged to perform one or more adjustments (box 268) such as in relation to roll, pitch and/or yaw (box 274), user inputs (box 276) such as manual adjustments and/or other inputs such as collision related inputs discussed below in relation to FIGS. 3-8.

Turning to the system in use according to several examples, FIGS. 2A-2B depict various implementations of the follow guidance path system 10 in use.

FIG. 2A depicts a schematic drawing of the follow guidance path system 10 in use with a following vehicle that is a tractor 20 pulling a grain cart 22, operating adjacent to a leading vehicle that in this example is a combine 30 in a field 100 traversing through several passes 2A, 2B, 2C and recording, storing and/or transmitting vehicle path data, as discussed in relation to FIGS. 1A-1E.

In the implementation of FIG. 2A, the guidance path system 10 records, transmits and processes vehicle path data (shown generally at 8) to generate a guidance path 12 for the tractor 20 to execute next to a combine 30 traversing a field 100 so as to maintain an optimum distance 48 between the center 40 of the grain cart 22 and the combine 30, such that grain exits the auger outlet 31 directly into the grain cart 22. It is appreciated that in such implementations, the guidance path 12 can be generated on a combination of vehicle data gathered from the leading and following data both from their respective current paths and, in the case of the leading vehicle in particular, from a previous path. That is, the system 10 is according to certain implementations is utilizing data, for example, drawn from a previous path by the leading vehicle as well as data drawn from both the leading and following vehicle in real time.

It is understood that in the implementation of FIG. 2A, the combine is on the third pass 2C, and the system 10 is therefore orienting the grain cart 22 relative to the combine position, swath, heading etc. from the second pass 2B. While this is an exemplary timescale, many other implementations are of course possible.

As discussed above, in various implementations, the follow guidance path 12 is generated in part by accounting for leading vehicle data (box 220 in FIG. 1D). Accordingly, in implementations like that of FIG. 2A, the leading vehicle 30 can be recording and/or transmitting leading vehicle data (shown in FIG. 1D at box 220) such as one or more of location data (box 230), swath data (box 232), leading vehicle characteristic data (box 234), field map data (box 236), leading vehicle motion data (box 238).

Continuing with FIG. 2A, such data is then processed to implement an offset 46 and guidance path 12 from, for example, the previously traversed swath by the combine 30 (in FIG. 2A, pass 2B) including the recorded swath center and edge, as discussed herein. It is appreciated that as discussed herein, the guidance path 12 according to these exemplary implementations is plotted through use of the offset 46 and any further utilized vehicle path data described herein. It is further appreciated that the offset 46 can be established in real time for guidance path plotting as discussed herein.

In one illustrative example, after the offset for the following vehicle/tractor 20/grain cart 22 from the leading vehicle/combine 30 (shown at 48) is defined or established, such as by manual entry into the system 10 as user input data (box 254) or by values stored in the system for the designated vehicle. The system 10 is thus configured to utilize vehicle path data (shown generally at box 206 in FIG. 1D) such as a swath center 42 swath width 44 and/or swath edge 50 to generate a guidance path 12 (shown generally at box 208 in FIG. 1E) by applying an offset 46 adjusting by any other utilized vehicle path data. As such, the distal or output end of the combine auger 31 is aligned directly or optimally above the grain cart 22, such as in the center of the grain cart, as would be understood.

It is appreciated that in exemplary implementations, the guidance path 12 is generated to maintain a substantially constant distance 48 between the following vehicle 20/tractor 20 and leading vehicle/combine 30 such that the auger outlet 31 is constantly oriented above the center of the grain cart 22 by the automatic steering system 24. It is understood that various tractor 20, grain cart 22 and combine 30 structural details such as the widths and lengths of those pieces of equipment and their components are accounted for as following vehicle characteristic data (box 240) in establishing the offset 46 from the previous pass 2B swath 44 center 42 and any additional utilized vehicle data, and therefore the corresponding distance 48 from the combine 30.

Figure 8A:
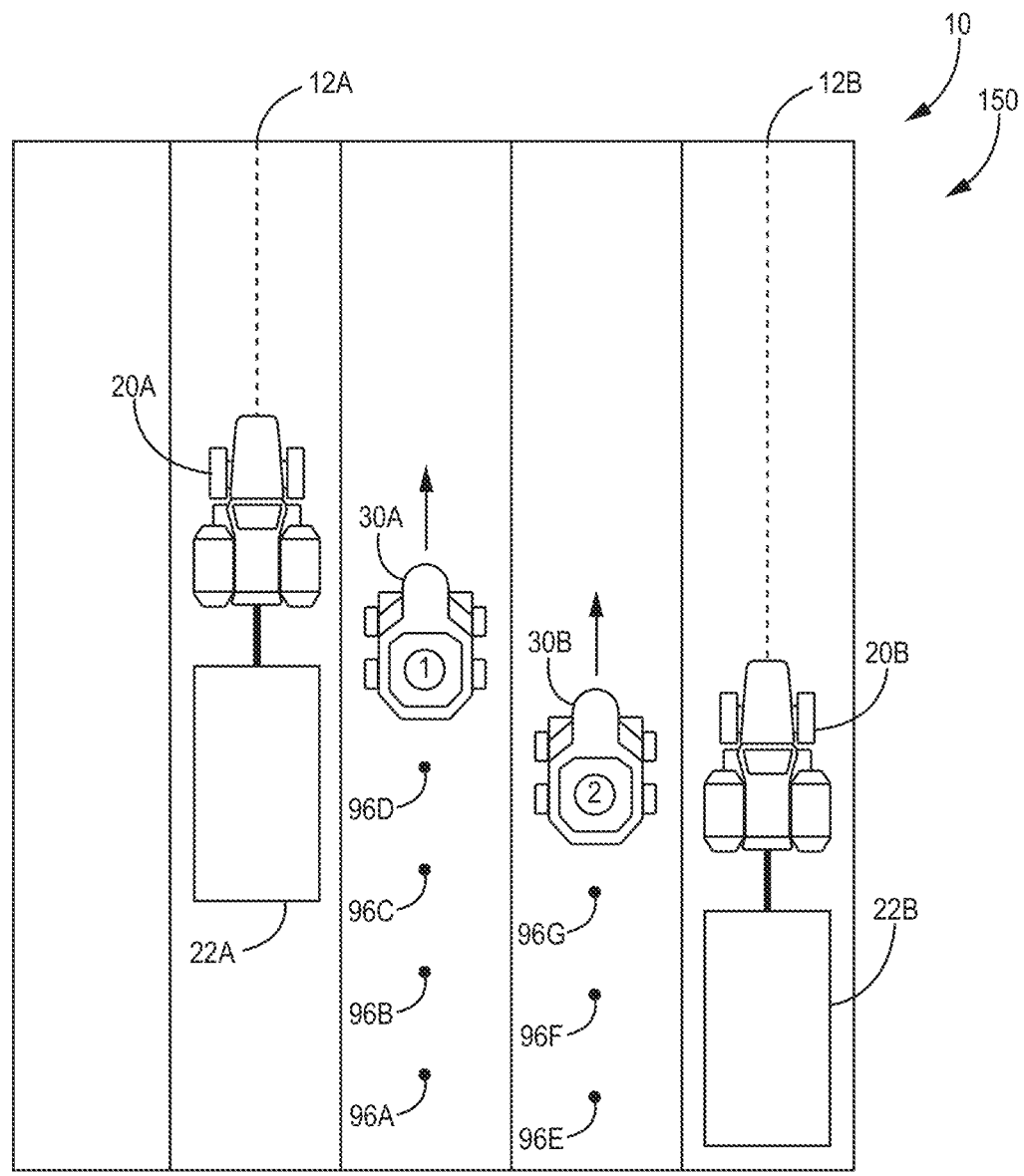
FIG. 8A is a top view schematic of an enterprise implementation of the follow vehicle path system, according to certain implementations.
Figure 8B:
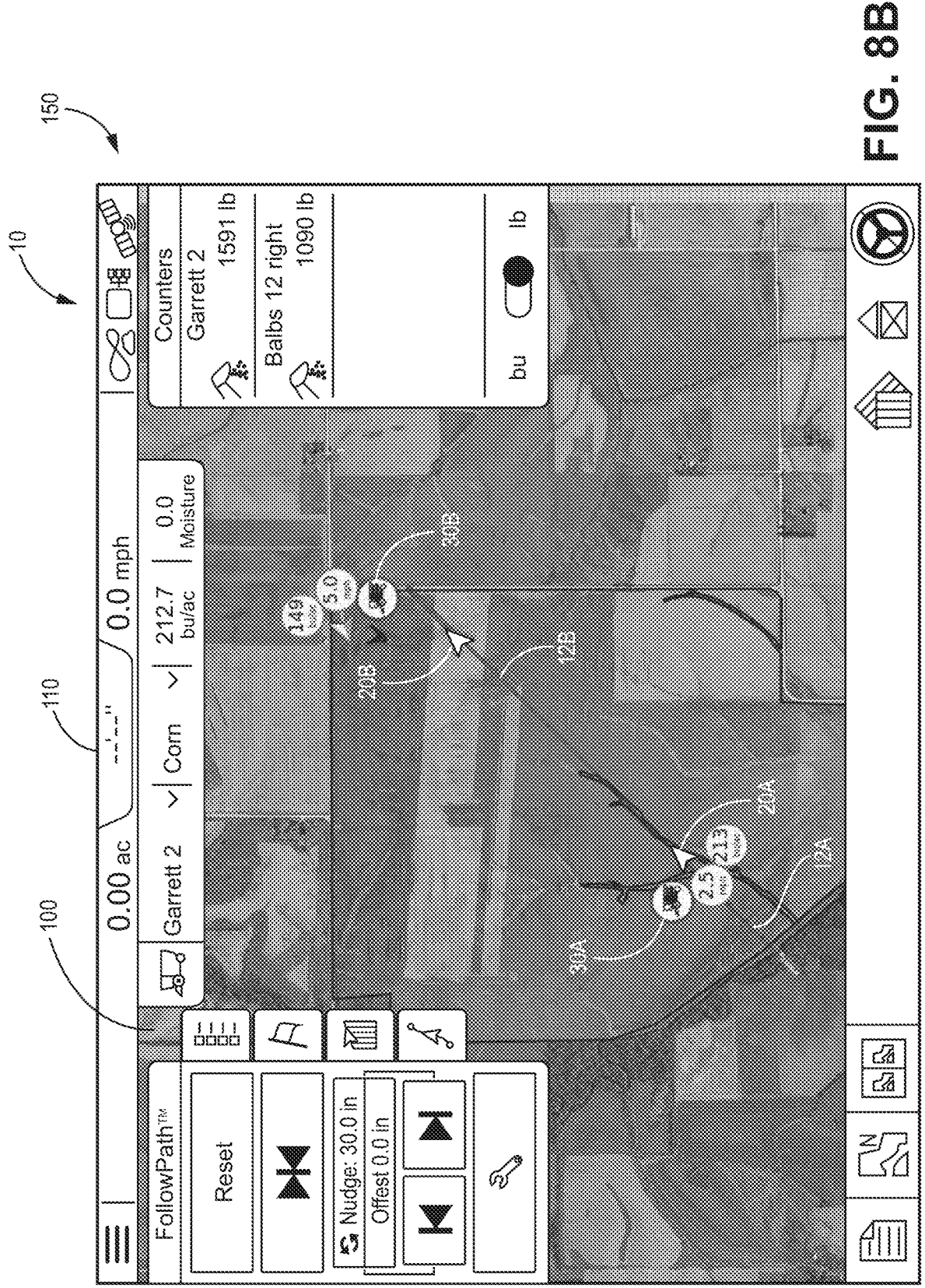
FIG. 8B is a view of the graphical user interface showing an enterprise system, according to one implementation of the follow vehicle path system.
Figure 8C:
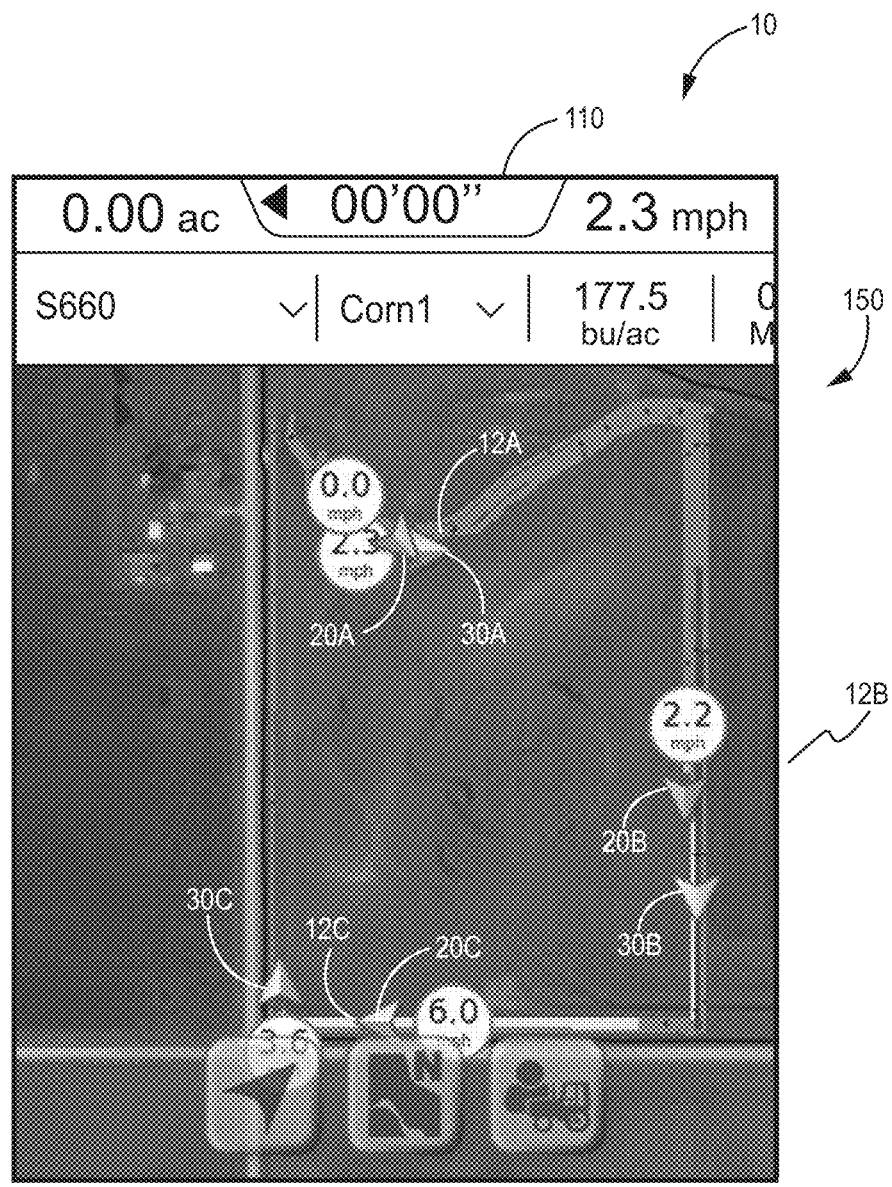
FIG. 8C is a view of the graphical user interface showing an enterprise system, according to one implementation of the follow vehicle path system.

Continuing with the vehicle path data and guidance path examples of FIGS. 2A-2B, it is understood that it is possible that a grain cart operator may wish to follow multiple combines 30 with different auger lengths in the same field 100, as is discussed further in relation to FIGS. 8A-8C. These implementations require the system 10 to establish and store a variety of offsets 46 to be associated with each leading vehicle such as a combine as various pieces of leading characteristic data (box 234 in FIG. 1D). The offset 46 distances can be stored and then selected and utilized automatically by selecting the appropriate offset 46 associated with the nearest combine in the field, or as indicated by the user via the operations unit/display, as would be readily appreciated.

In certain implementations, the guidance path 12/offset 46/46A can be further adjusted manually or automatically, such as via buttons 110A on the GUI 110, as discussed in relation to FIGS. 1C-E. Such adjustments can be made, for example, to the right or left, based on roll of the leading and/or following vehicle. That is, it will be appreciated that if the combine 30 is in a roll—non-perpendicular—that rolled state can lead to the grain exiting the auger outlet 31 further in one direction or another than would be the case in a perpendicular orientation. In these implementations, the system 10 is constructed and arranged to increase or decrease the offset 46 to account for roll or other vertical alignments toward or away from the grain cart 22. Further adjustments are of course possible as would be appreciated by those of skill in the art.

Similarly, it is understood that when, during use, the grain cart 22 is traveling on a hillside or other non-flat surface, it will travel more to the right or left than typical center. Thus, in these circumstances the system 10 can be adapted to accommodate by adjusting the offset 46, again adjusting the offset 46 positively or negatively so as to account for a known amount of drift. In alternate implementations, a manual adjustment to the offset 46 can be implemented via the operations unit 102 to account for combine roll and/or grain cart drift.

Additionally, when the grain cart 22 is rounding a curve, it is liable to predictably drift beyond the tractor curve or otherwise pivot outside or inside the curve of the tractor 20 around the curve. In these implementations, it is therefore understood that the curve of the grain cart 22 around the curve can be projected to be tighter, wider or otherwise divergent from the curve of the tractor. Accordingly, the in various implementations the system 10 is adapted to plot the guidance path 12 so as to account for grain cart drift to maintain alignment with the combine around such corners.

In various implementations, as shown for example in FIG. 2A, the various vehicle path data 8 (shown in FIGS. 2A-2B) is derived from, the combine 30 as it traverses the field 100, as is shown at reference arrow A. It is understood that in these and other implementations, the combine 30 is collecting various types of harvest vehicle path data 8 for input (as discussed in relation to FIG. 1D at box 206) showing the various passes 2A, 2B, 2C, including combine swath width 44, swath center 42 and heading, as well as the amount of harvested material that has been collected, which can be represented on the display 104 shown in FIGS. 1B-1C. In various implementations involving multiple combines 30 operating in a single field 100, the vehicle path data 8 can be augmented by data relating to how full the individual combines 30 can be, such as by weight or time, so as to allow a grain cart 22 and tractor operator to prioritize the collection from those various combines for maximized efficiency.

In certain implementations configured to support following data that contains multiple swath widths, as shown in FIG. 2B at passes 2A, 2B, 2C, the offset 46 from a swath centerline 42 is not stored directly. Instead, the system 10 can track the swath edge offset 46A, which is established from the edge 50 of the swath 2B rather than its center 42. The vehicle path data can also include the width 44 of the swath that was used to generate each line. Then, the correct offset 46 can be calculated as:

$$\text{Offset} = (\text{Swath Width}/2) - \text{Swath Edge Offset}$$

whenever the grain cart begins following a line with a different swath width or switches to following a combine with a different associated offset 46A.

It is understood that vehicle path data 8 (shown in FIG. 1D at box 206) can be transmitted in real-time to generate the guidance path 12 for the automated steering of the tractor 20 such as via an automated steering system 24 integrated into the tractor 20, such as those that have been previously described in relation to GNSS-based automatic steering systems known in the art. It is understood that a variety of commercially-available automatic steering systems 24 may be used. It is further understood that various forms of electronic communication can be utilized by the various equipment 20, 22, 30, such as LTE, cellular, Bluetooth and WiFi connectivity to place these pieces of equipment 20, 22, 30 in electronic communication with one another, such as via the communications unit 114 shown in FIGS. 1B-1C.

Figure 3:
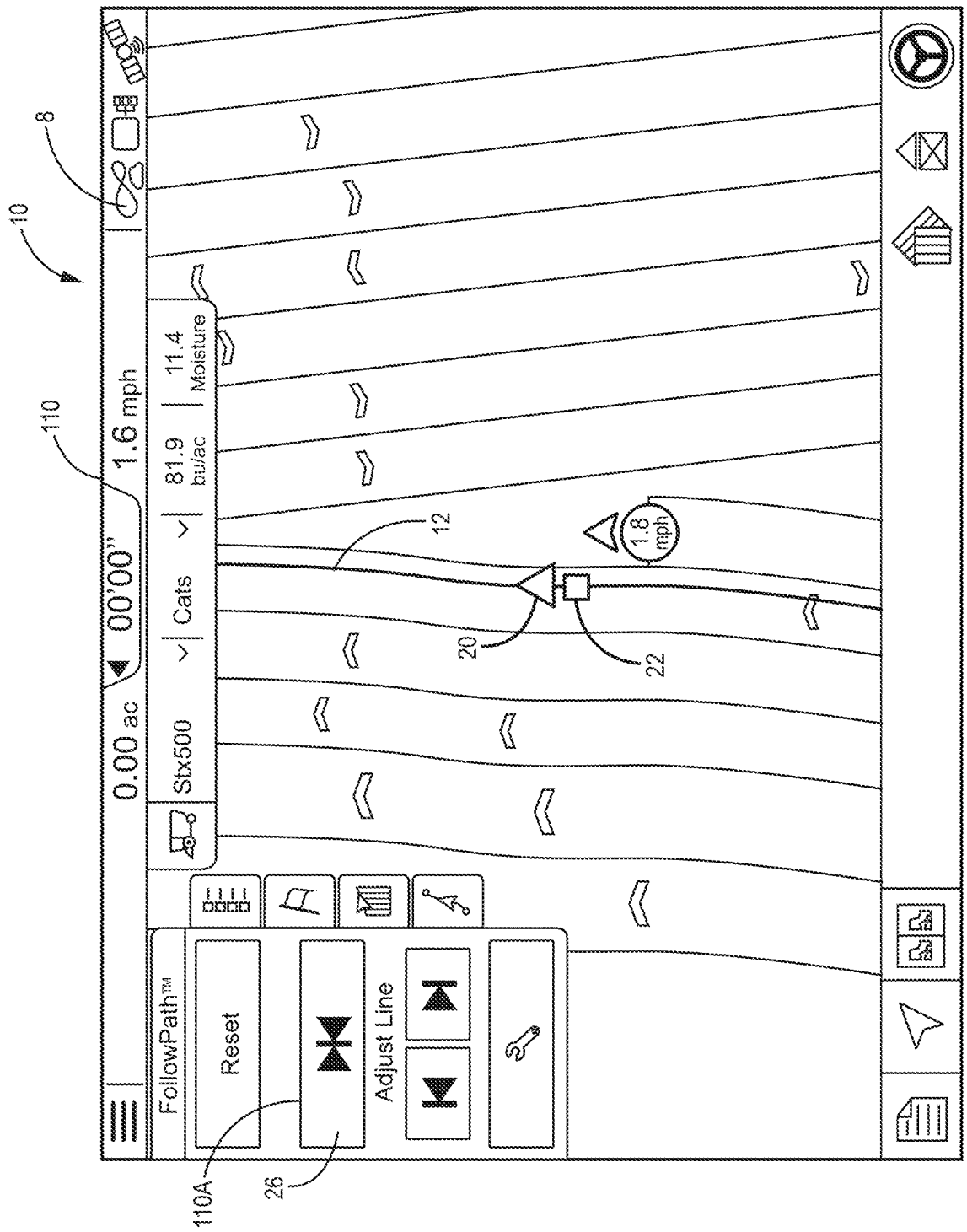
FIG. 3 is a schematic of the follow vehicle path system having a graphical user interface, according to one implementation.

In various implementations, the follow guidance path 12 for the following vehicle such as tractor 20/grain cart 22 shown in FIG. 3 is calculated using vehicle path data including, for example, a harvest map showing leading vehicle swaths and an offset 46 distance from a previous, adjacent combine swath path and the center 42 of that previous combine swath width 44. In these implementations, the offset 46 distance is established by the distance between the center 42 of the combine swath width 44 and the center 40 of the grain cart 22 throughout the various passes 2, as is also shown in FIG. 2A, taking into account the various vehicle path data types discussed above in relation to FIG. 1D.

In the example of FIG. 3, the GUI 110 indicates the location of the tractor 20 and cart 22, as well as any relevant combines 30, showing icons indicating heading and progress as well as other aspects of the travel and harvesting of each, including a guidance path icon 12A indicating the location and heading of the follow vehicle 20/22 in real time. Further implementations and features are of course possible, such as speed, yield, moisture and the like, as have been previously described.

Figure 4A:
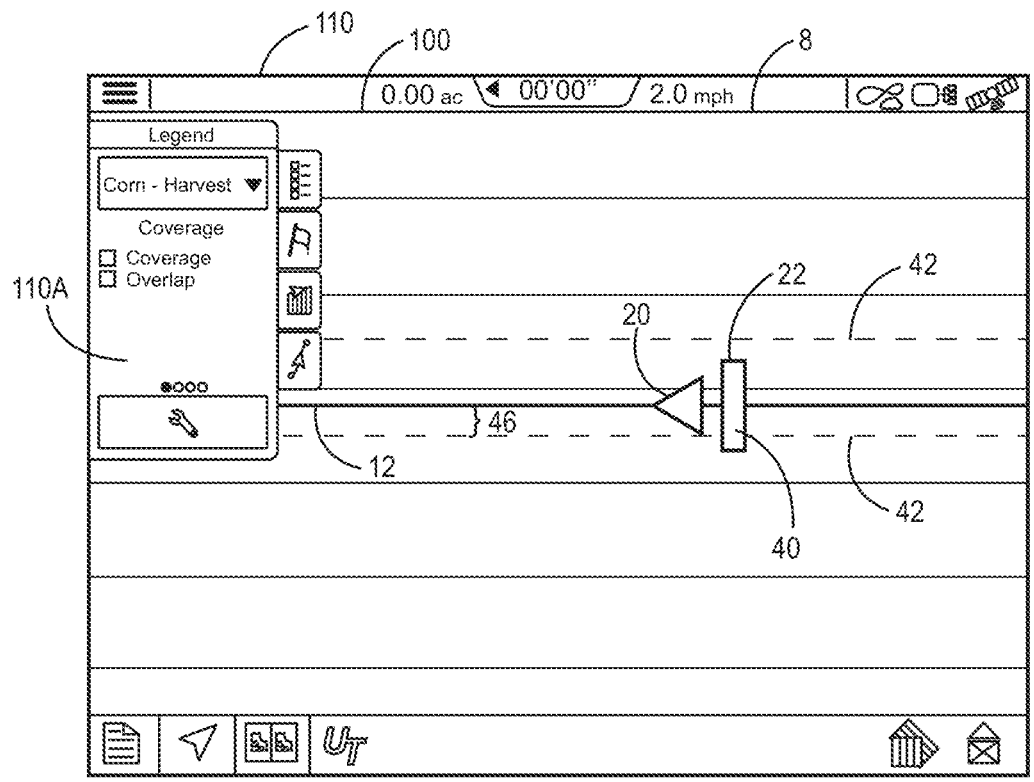
FIG. 4A is a view of the graphical user interface showing a first direction of travel for the grain cart, according to one implementation of the follow vehicle path system.
Figure 4B:
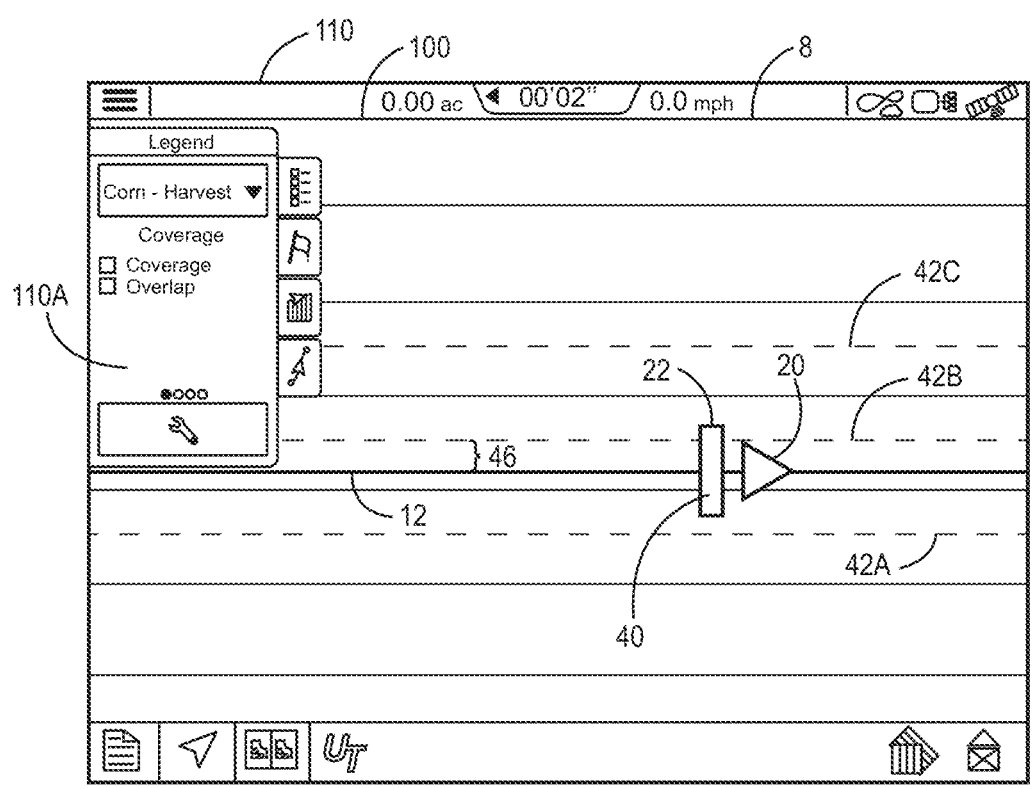
FIG. 4B is a view of the graphical user interface showing a second direction of travel for the grain cart, according to one implementation of the follow vehicle path system.

In use according to certain implementations, and as shown in FIGS. 4A-4B, after the grain cart 22 is next to or otherwise adjacent to a combine 30, the system 10 is configured to generate the guidance path 12 comprising the appropriate offset 46 distance. In certain exemplary implementations, the generation of the guidance path 12 is performed by toggling a centering feature 26 button 110A on the GUI 110 or elsewhere on the operations unit 102, as shown in FIGS. 1B-1C. It is understood that in certain implementations, the generation of the guidance paths can be a one-time function, that is, after it has been set initially, it need not be performed again.

In these and other implementations, after being prompted by the user or otherwise engaged, the system 10 generates the guidance path 12 for the tractor 20—and correspondingly the grain cart 22—to follow through the field 100 so as to maintain an optimum distance from the combine 30 for the collection of grain therefrom. In various implementations, the system 10 is constructed and arranged to establish the offset 46 distance distance from the distance between the center of the combine swath width 44 and the center 40 of the grain cart 22 throughout the various passes 2A, 2B, 2C as is shown in FIG. 2A.

Importantly, as shown in FIGS. 4A-4B, the direction of the grain cart 22 (shown variously FIGS. 4A and 4B) can be critical in determining the orientation of the offset 46 distance distance. In other words, the offset 46 distance is established relative to the current direction of travel (FIG. 4A vs. FIG. 4B) of the grain cart 22/combine 30 so as to be appropriately offset 46 from the location of the relevant center 42A, 42B, 42C of the follow vehicle path and correctly orient the following vehicle 20/22 relative to the leading vehicle 30 as it traverses the field. It is appreciated that such heading information is processed as heading data as discussed in FIG. 1D at box 248.

That is, if the offset 46 disposes the following vehicle 20/22 center 40 closer to the combine 30 than the center 42A, 42B, 42C of the previous path of the combine, it is important to account for that offset 46 in the proper direction when collecting from the combine on the current path. It is understood that a grain cart 22 is designed to typically travel on the left side of the combine 30, though alternate implementations—such as on the right, behind, or elsewhere—are of course possible, such as would be the case in a forage harvester or the other agricultural or other machines described below, such as a gravel feeder travelling with a tile plow.

In these and other implementations, the center 40 of the grain cart 22 with respect to the center 42A, 42B, 42C of the relevant, adjacent combine swath differs depending on the direction of travel (shown alternatively at FIGS. 4A and 4B). In certain implementations, for example, the offset 46 distance is designated as positive or negative depending on the direction of travel and/or orientation with respect to the combine swath width center 42A, 42B, 42C, the grain cart 22 and grain cart tractor 20 and/or grain cart 22 alone.

Therefore, if the grain cart 22 or other following vehicle is traveling on a designated side of the combine 30 or other leading vehicle, the offset 46 distance will be applied directionally relative to the center 42A, 42B, 42C of the combine swath.

Using a coverage map to create a guidance path 12 can be a complex process, as the data used to build the guidance path 12 may not always be complete. In various implementations, the vehicle path data 8 can comprise a field map 100 that can be established using points which have been logged by the leading vehicle 30 at a set frequency. These points can include excess data that the system 10 must filter out and/or generated or plotted points along the path generated on the basis of known data such that a seamless guidance path 12 is generated.

In an illustrative example, a combine 30 is harvesting through areas of the field 100 with no crop or areas that have already been harvested. In these instances, the system 10 is constructed and arranged to generate following guidance path 12 points to account for swath widths (processed as swath data box 232 in FIG. 1D) that are partial 60 (as shown in FIG. 5) and/or fill in the gaps 62 (as shown in FIG. 6 and discussed in FIG. 1E at box 262). It is understood that linear interpolation or other mathematical or statistical tools designed to estimate, smooth and fit to a curve via plotted data points on the guidance path 12 on either side of the partial 60 or gap 62 can be used to generate best fit lines to cover such partials 60 and gaps 62. Further approaches are possible in alternative implementations, as would be readily appreciated.

In certain implementations, after being generated, offset distances 46/guidance paths 12 can be stored for later use, such as in the operations unit 102, in cloud 120 servers 122/databases 124 or elsewhere, as would be understood, as shown in FIG. 1B.

When multiple combines 30 are in use, a composite harvest map 100A can be generated in near-real-time from the recorded leading vehicle path data. This map 100A according to certain implementations includes data from all leading vehicles (combines) 30 present in the field at one time, and is used to generate the follow guidance path 12 for one or more following vehicles (tractors 20/grain cart(s) 22), which is constructed and arranged to auto-detect the nearest combine 30 such that data from that combine 30 is utilized to generate the guidance path 12. That grain cart 22, therefore, can steer next to any combine 30 in the field and a guidance path 12 based on the steered-to combine 30 and will be generated in near-real-time.

Further implementations can also include one or more of the following features to increase the accuracy of the automated navigation.

The system 10 can be constructed and arranged such that the operator can manually adjust the path 12 of the grain cart 22 by input through the operations unit/GUI 110 that are processed as user input data (shown in FIG. 1D at box 254). In certain implementations, the adjustment can be made by manually steering the vehicle to the left or right of the path. In additional implementations, the alignment via of the guidance path 12 can be manually adjusted incrementally, such as through use of a toggle button on the GUI 110, that is, additional incremental distances—such as inches or feet—can be added or subtracted from the offset by the user in response to the real world environment.

Further, implementations can include one or more safety features to prevent accidents and downtime and improve efficiency.

The system 10 also can alert the operator that the path 12 they are traveling on is ending, or through the use of logic is able to detect whether the combine 30 is at the beginning or the end of a pass 2 and that coming into alignment with the combine 30 is not desirable and could result in a collision or otherwise be inadvisable for reasons that are well understood.

Figure 7A:
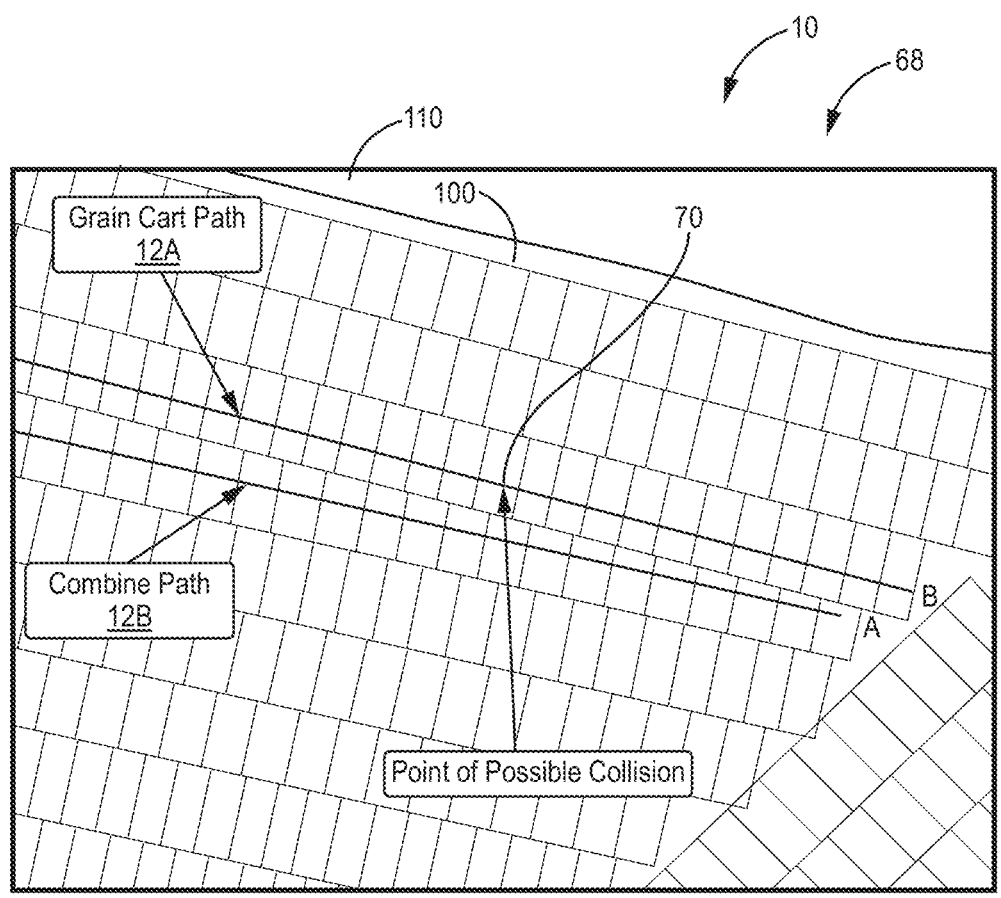
FIG. 7A is a view of the graphical user interface showing converging guidance paths, according to one implementation of the follow vehicle path system.
Figure 7B:
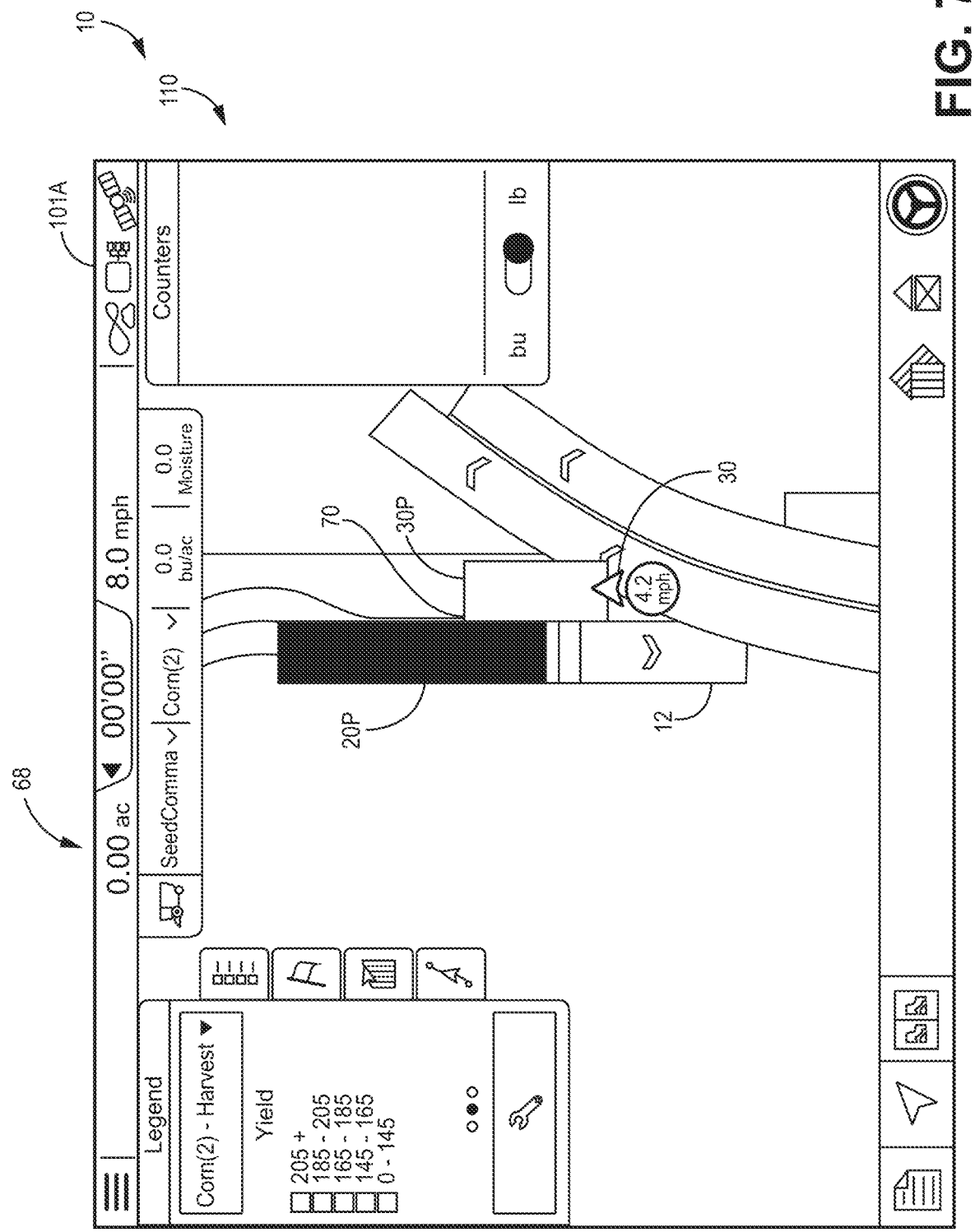
FIG. 7B is a view of the graphical user interface showing a collision detection system, according to one implementation of the follow vehicle path system.

In certain implementations, and as shown in FIGS. 7A-7B, the system 10 comprises a collision system 68 constructed and arranged to issue safety alerts to users, that is, for example, to give a collision warning if at any point during the grain cart path 12A it detects that the grain cart 22 will collide (shown at point 70 in FIG. 7A) with the combine path 12B. In various implementations, the system 10 is constructed and arranged to compare the relevant guidance paths 12A, 12B, while in alternate implementations the system can predict the combine path 12B based on the combine direction of travel and/or the harvest map. In further implementations, the combine operations unit is able to predict or otherwise estimate possible collision points 70 by estimating if certain collision parameters and/or thresholds are exceeded.

That is, if the collision system 68 detects that a grain cart path 12A and the current heading and/or direction of the combine or if applicable, the guidance path(s) 12A, 12B and/or previously logged data indicate that a collision is possible, the system 10 is able to alert the user and/or prevent collision via the operations unit/display/automatic steering system, such as by issuing an audible alarm, displaying an alert message and/or disengaging the steering, as would be readily appreciated.

It is understood that these implementations, the collision system 68 can establish certain collision parameters that include known widths of the tractor 20, grain cart 22 and combine 30, along with any additional tolerances—that is extra feet or inches included in the estimation to account for inaccuracies such as GPS differential and the like—that are included in the collision estimation. Further implementations include a calibration protocol that allows the user to establish the widths of certain components, such as the combine head, in setting the collision parameters.

In further implementations of the collision system 68 and as shown in FIG. 7B, the system 10 can utilize the position(s) and/or projected position(s) of the leading 30 and following 20 vehicles relative to one another to prevent collisions. That is, in the implementation of FIG. 7B, the system 10 according to these implementations renders a leading vehicle 30 projection 30P and/or a following vehicle 20 projection 20P on the raster of the recorded swaths (shown generally at 101). In various implementations, the projections 20P, 30P are polygons that represent the size of the vehicles 20, 30 and the current speed(s). That is, as the speed of a vehicle 20, 30 increases, the length of the polygon will increase in the direction of the heading to account for the distance covered by the respective vehicle over a unit of time, such as about one second or more. It is appreciated that in the case of leading or following vehicles comprising several parts, such as for example a tractor 20 and grain cart 22, the relevant projection 20P is sized to accommodate both vehicles 20, 22, as would be readily appreciated by those of skill in the art.

In implementations featuring the collision system 68 such as that of FIG. 7B, the system 10 is constructed and arranged to determine whether the projections 20P, 30P s will intersect with one or more of the existing paths (shown in FIG. 7B at 12) to create a collision point 70 in the raster 101. If a potential intersection or collision is detected, the system 10 is thus constructed and arranged to issue an alert to the user and/or disengage the automatic steering and/or slow the vehicle(s) 20, 30 as would be readily appreciated. Further, this and any of the other technologies described herein can be combined with any of the technologies taught or otherwise disclosed in Co-Pending U.S. Application No. 63/048, 797, filed Jul. 7, 2020 and incorporated by reference in its entirety.

It is understood that in the event that the collision system 68 detects a possible collision, certain implementations execute an additional verification protocol to ensure that the grain cart tractor 20 is actually proximal to the combine and in motion on the course to the detected possible collision point 70 so as to prevent false positives, for example in circumstances where the grain cart tractor is not following the guidance path 12A.

In exemplary embodiments, the collision system 68 is configured to monitor the GPS positions of the combine 30 and the grain cart 22 in real time. That is, in these implementations, if the distance between the combine and grain cart drops below an established threshold, a warning and/or prevention—such as disengagement of the automatic steering system 24—can be applied.

In any of these implementations of the collision system 68, the various warnings and/or alerts can be provided via the operations unit in the grain cart tractor 20 and/or combine 30 so that either or both operators can be alerted.

Various implementations of the collision system 68 comprise an alert system, such as through the operations unit. For example, in certain implementations, the system 10 can be programmed to constantly or intermittently issue visual and/or auditory alerts to the user when the automatic steering system 24 is engaged to continually notify the user the system is enabled and active. Various forms of alerts such as visual cues and/or auditory tones alerts can be utilized in certain aspects, as would be readily appreciated.

Additionally, during use according to certain implementations having the collision system 68, when the automated steering system 24 disengages without the operator doing so, the system 10 is constructed and arranged such that the grain cart 22 will automatically disengage in a direction opposite the combine so as to prevent a collision with the combine 30. Upon disengagement, according to certain implementations, the system 10 is constructed and arranged to omit an audible alarm or alert, such as via the operations unit to notify the user that the guidance path has ended. In certain implementations, the audible sound is at a louder than normal volume to be sure to alert the user. The system 10 can also be constructed and arranged to detect potential hazards and/or collisions and deviate or steer the tractor away the from the guidance path 12 if a potential collision or sharp turn is predicted/detected.

Certain implementations of the collision system 68 have a prospective timing system, for example, wherein if no new GPS updates from the leading vehicle have been received in a defined number of seconds, then the system 10 prevents engagement of the tractor 20 and/or a warning message is displayed or issued, as would be understood.

Further implementations of the collision system 68 require a proximal association, that is, the grain cart 22/tractor 20 must be within an established distance of a target combine 30 to allow engagement. In certain of these implementations a warning message is displayed or otherwise issued.

Alternate implementations of the collision system 68 only permit combine engagement of the grain cart 22 if it is within a specified distance of the guidance path. Further implementations only permit engagement of grain cart tractor if within a range of angles of the guidance path. Additional implementations of the system 10 include further vector—speed, angle and/or distance—restrictions on engagement.

Additionally, according to certain implementations of the system 10 having the collision system 68, the operator can be presented with a warning message/tone if the future guidance path has a sharp or otherwise abrupt turn. In these implementations, the steering system can disengage when such turns are detected and again, present a warning message. Further implementations of the system 10 can also not allow a re-engagement until a specified number of seconds has elapsed, or after the sharp turn has been avoid.

In implementations where the system 10/collision system 68 detects that the tilt or roll of the combine 30 and/or grain cart tractor 20 is greater than a specified number of degrees, a warning message can be displayed or emitted, and/or the steering system 24 is automatically disengaged in either the grain cart tractor 20 and/or combine 30.

As shown in FIGS. 8A-8C, in certain implementations the system 10 has an enterprise system 150 constructed and arranged to create and manage a plurality of guidance paths for enterprise implementations, that is, in implementations where multiple leading 30A, 30B and/or following vehicles 20A, 22A, 20B, 22B are being used simultaneously.

In these implementations having an enterprise system 150, each leading vehicle 30A, 30B can produce a time series of vehicle data 96 (shown in FIG. 1D at box 220) for one leading vehicle 30A at 96A, 96B, 96C, 96D and another leading vehicle at 96E, 96F, 96G.

It is readily appreciated by those of skill in the art that input of time series of vehicle data (96A, 96B, 96C, 96D and 96E, 96F, 96G) being recorded by the system 10 contemporaneously can present opportunities for intermixing or cross-over, which could result, for example in a guidance path which "zig zags" between the cohorts of vehicle data (96A, 96B, 96C, 96D and 96E, 96F, 96G)

Accordingly, the system 10 according to these implementations is constructed and arranged to record and utilize the respective time series of vehicle data (96A, 96B, 96C, 96D and 96E, 96F, 96G) such that these timeseries of vehicle location data are partitioned and self-ordered for separate use. That is, as would be appreciated, in certain implementations, the system 10 is constructed and arranged to tag the timeseries of vehicle data (96A, 96B, 96C, 96D and 96E, 96F, 96G) with a signature according to the source vehicle 30A, 30B so as to accurately draw distinct guidance paths 12A, 12B and avoid cross-over. In various implementations, a combination of approaches can be used to prevent cross-over, such as source vehicle 30A, 30B telemetric tagging, as well as the comparison of the position and heading information with defined thresholds for allowable deviation in travel direction and distance to determine if a prospective plotted guidance line point qualifies as an extension of the path instead of a different path.

Further, as would be appreciated, in certain implementations, the system has a manual override to account for embodiments where a following vehicle 20A/22A must cross swaths, such as in the case of a mechanical failure of one of the leading vehicles 30A, 30B. Further implementations are of course possible, as would be appreciated.

Additionally, the system 10 can be constructed and arranged to only display the current guidance path 12, not any past or future paths, so as to avoid operator confusion and/or collisions. Further implementations of the system 10 feature additional safety features for use with multiple combines 30 in the same field, such as were discussed above in relation to FIGS. 7A-7B.

For example, the system 10 can be constructed and arranged such that verification checks can be applied when multiple combines 30A, 30B are running in the same field 100. It will be appreciated that these verification checks can be used because a grain cart 22A, 22B may be physically closer to a first combine 30A, but because of system lag it may inaccurately estimate that either grain cart 22A, 22B is closer to a second combine 30B operating in the field. The importance of this is appreciated because the system 10 needs to which of the various combines is closest to the grain cart to establish the proper offset, as described above.

In certain implementations, such as those of FIGS. 9A-9D, the system 10 has a counter reset system 160 that operates between the leading and following vehicles to allow, for example, combine operators to better approximate the grain load of the combine on-the-go. It is appreciated that modern combines typically have flow meters constructed to approximate the intake of grain during harvest. However, when unloading the combine on-the-go, current combine technologies do not allow for the ability to account for unloaded grain on their grain counters.

Figure 9A:
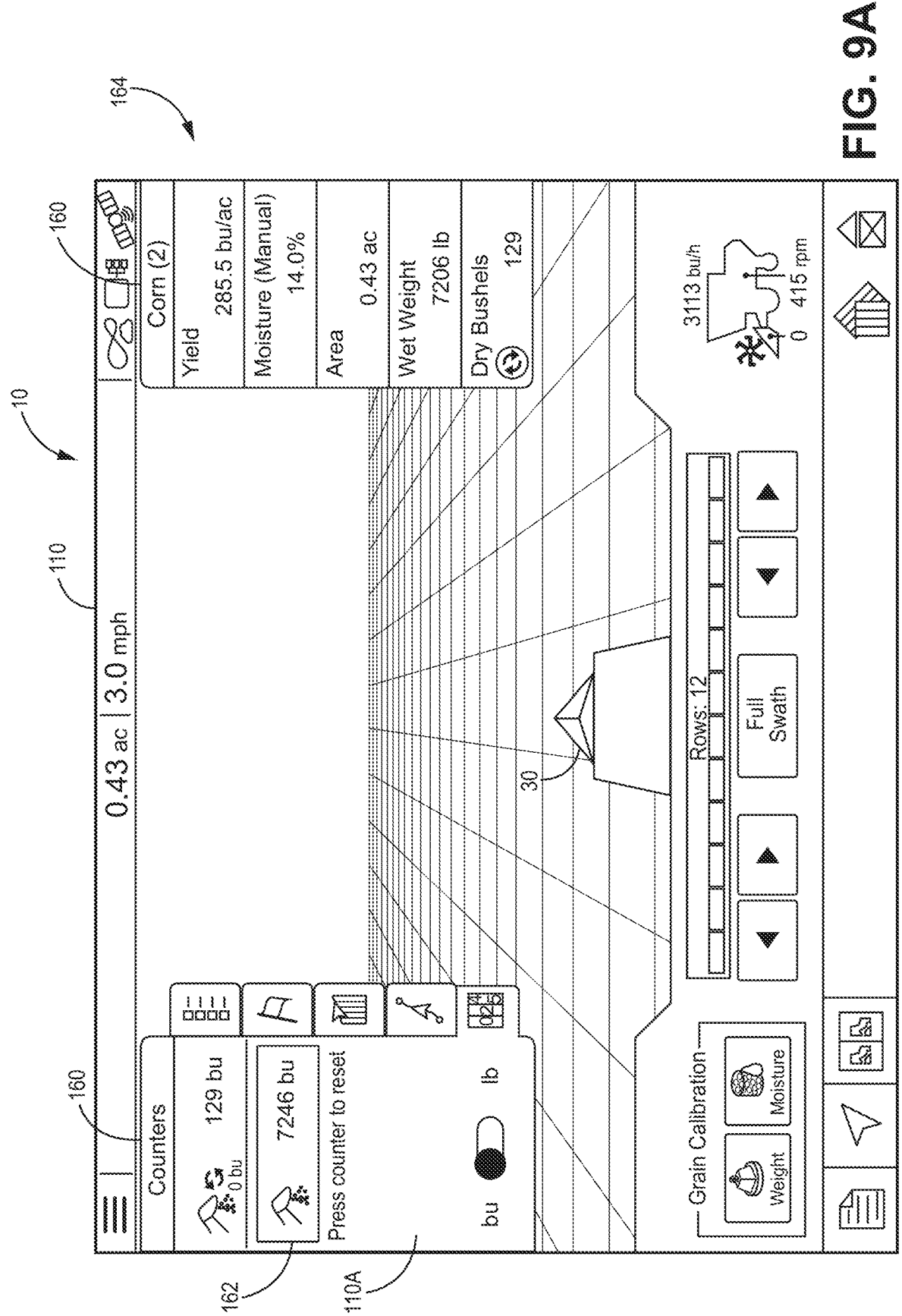
FIG. 9A is a view of a graphical user interface showing a counter reset system, according to one implementation of the follow vehicle path system.
Figure 9B:
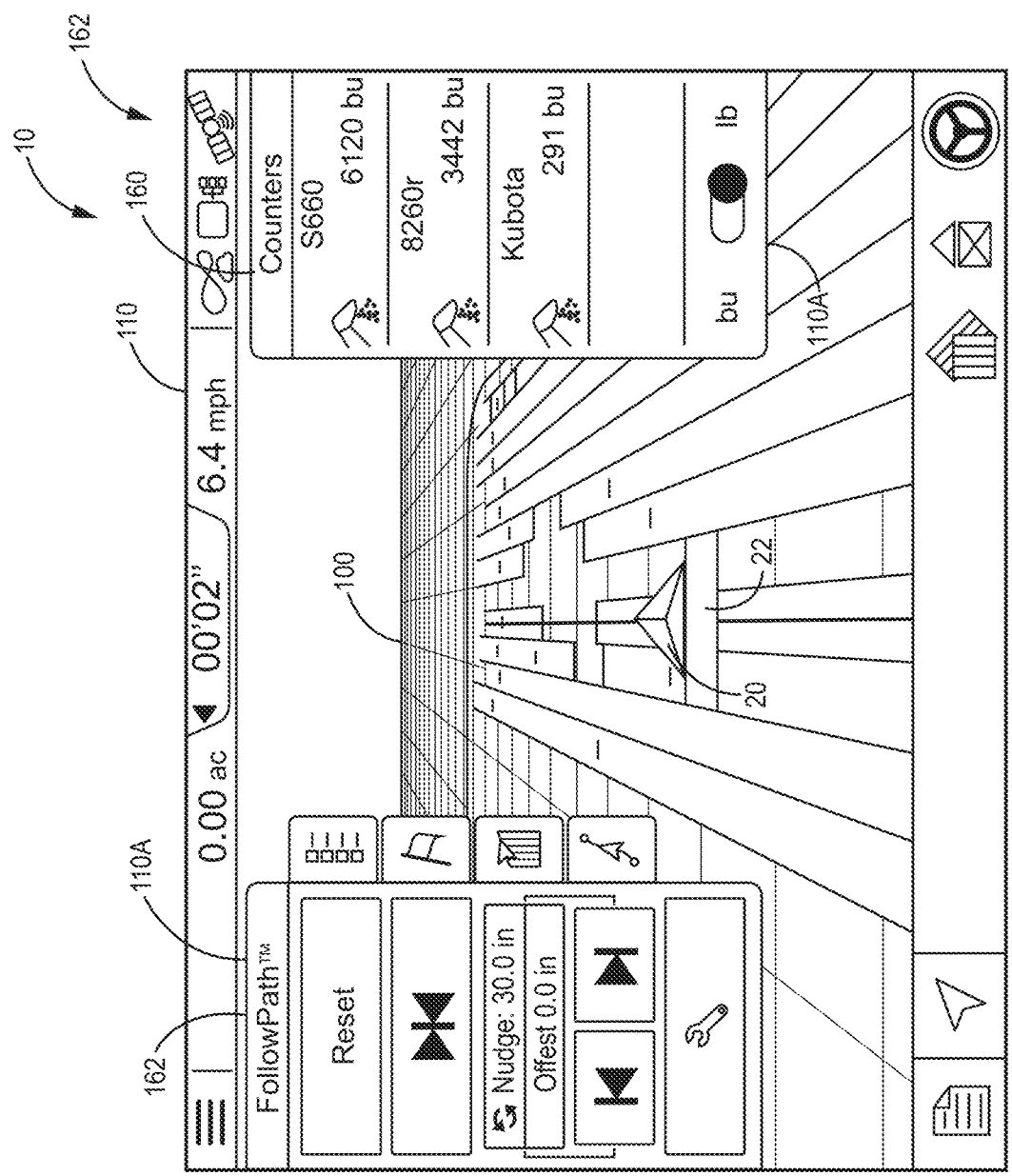
FIG. 9B is a further view of a graphical user interface showing a counter reset system, according to one implementation of the follow vehicle path system.

As shown in FIGS. 9A-9B, in use the combine operator is able to see various aspects of the harvested grain count, the GUI 110 has a number of informational boxes and buttons 110A used to convey or estimate a number of harvest factors 162 about the harvested grain, such as an estimate of the number of bushels and various other grain counts, such as the yield, moisture, area, weight, current and total number of bushels and the like, as would be understood. In various implementations, the GUI 110 further allows the user to manually reset these harvest factors 162.

Figure 9C:
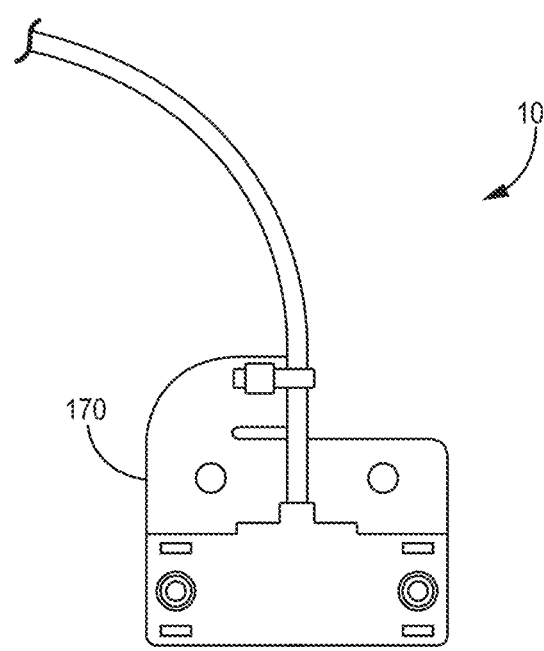
FIG. 9C is front view of a counter reset system sensor, according to one implementation of the follow vehicle path system.
Figure 9D:
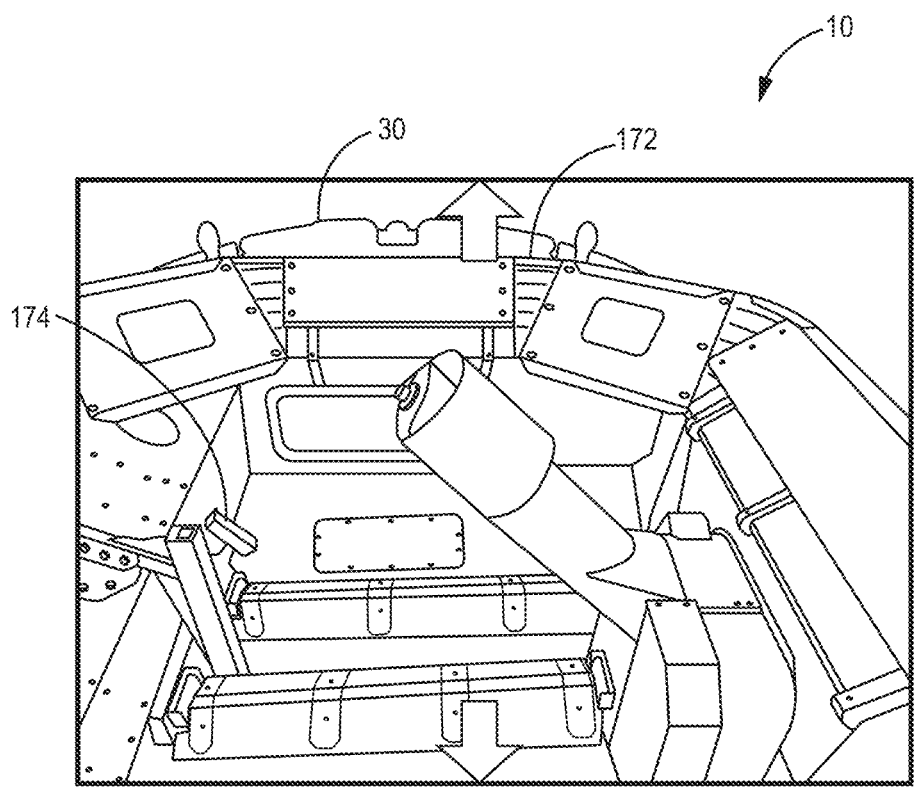
FIG. 9D is a perspective view of the interior of a grain tank showing a sensor mounting position, according to one implementation of the follow vehicle path system.

Relying on a manual reset can be less reliable than an automated system, however. As such, in the implementations of FIGS. 9A-9B and as shown in FIGS. 9C-9D, in certain implementations of the system 10 having the counter reset system 160 a sensor 170 such as a capacitive sensor 170 is fitted in the interior of the combine 30 grain tank 172, such as via a mounting bracket 174 mounted, for example near the discharge auger of the grain tank 172. Other mounting locations are of course possible.

In use according to these implementations, the sensor 170 operates is set at a specified depth, such that when the grain level in the grain tank 172 is reduced below the sensor 170, the sensor 170 communicates to the combine 30 operations unit a sensor signal which resets the bushel count or other harvest factors 16, as established by the operator. Such transmission can occur via a wired or wireless connection. It is appreciated that in these implementations, the harvest factors 162 can thereby be reset automatically, rather than relying on operator input. As such, the counter reset system 160 according to these implementations automatically resets, for example, the bushel count to a defined bushel count that is calibrated to the capacity of the grain tank 172 below the sensor 170, as would be appreciated. That is, for example, if the sensor 170 activated when 25 bushels have been deposited in the grain tank 172, the bushel counter will be reset to 25 bushels when the grain tank has been unloaded sufficiently to deactivate the sensor, as would be readily appreciated.

Certain implementations of the system are configured to evaluate and/or correct GPS location data. In various implementations, valid GPS differentials can be recorded vehicle path data. In these implementations, the steering system 24 of the following vehicle 20 can utilize recorded GPS differential data to determine if a guidance path should be generated or not based on if the GPS differential is within established thresholds or tolerances. In certain implementations, the system can verify that both the leading and following vehicles are running at sufficiently high GPS differentials or otherwise verify that they are within established tolerances or thresholds between all vehicles operating in the field to prevent improper alignments, as would be readily appreciated. Along with guidance path creation/no creation states, a proper warning message or guidance path adjustment can be implemented, such as by map shifting or other techniques understood by those of skill in the art.

Further implementations of the system 10 are constructed and arranged to account for GPS drift. These implementations allow users to adjust all plotted guidance paths 12 for established North/South and/or East/West drift, such as by manual map shifting via the GUI 110, as would be understood. Such drift is accounted for by introducing a defined drift constant into the offset calculation, as would be readily appreciated. It is understood this allows the following vehicle operator to run a different GPS differential than is used in the leading vehicle.

Certain implementations only allow a single guidance path to be shown on the display, so as to allow an unexperienced grain cart operator to be guided to the proper location of the field to unload.

In certain implementations, the offset 46 distance can be manually entered by measuring the distance from the center of the combine 30 to the unloading auger and entering that value into the system.

While the disclosed implementations relate to the use of the guidance path 12 in conjunction with grain carts/combines, various implementations relate to use in conjunction with a gravel feeder traveling beside a tile plow, feeding tile into a tile plow, dirt scrapers and all manner of agricultural harvest operations relating to grains as well as other crops such as fruits and vegetables.

When the combine has a guidance path 12B loaded into its operations unit, the system 10 can transmit the same guidance path 12B to the grain cart tractor 20/operations unit 102, thereby allowing the grain cart 22 to be guided along this same line. When this method is performed, there is again an offset 46 applied to the grain cart guidance path 12A and can be managed by the combine or grain cart tractor operations unit 102.

Further, it is understood that in various implementations discussed above, the various guidance paths 12 are created on the basis of real-time vehicle path data 8, but in alternate implementations it the system 10 is constructed and arranged to generate guidance paths on the basis of recorded vehicle path data 8, with the proper offsets 46 applied to account for planting width, harvest width, and/or combine auger distance. For example, when a crop is grown in rows—like corn—a combine can serve as a following vehicle 20 and will follow the planted rows, as discussed further below. Thereafter, the combine can be used as a leading vehicle 30 for a grain cart as a following vehicle 20 so as to be guided via guidance path 12 to follow these same rows on the basis of recorded and stored planting data. That is, in these implementations, guidance paths can be followed in succession, such as from the planter to the combine and then from the combine to the grain cart, as will be appreciated by those of skill in the art. As such, one vehicle, here a combine, can serve as a following vehicle and then leading vehicle under certain implementations such that stored guidance paths and/or vehicle path data 8 can be utilized by the system 10 for subsequent applications.

In one such example approach, a planter 80/planter tractor 90 can create vehicle path data 8 such as a field map while planting that is available for use to a following vehicle 20 that is in this example a combine. That is, in the spring a planter operator can create and store vehicle path data for use by the system 10 in the fall harvest with a combine. In such implementations, a user can create a field map 100 off of an as-applied/stored vehicle path data 8 such as swath data, thus giving the combine operator a guidance path 12 where the following vehicle 20 should be driven via an operations unit 102 having access to the previously-stored vehicle path data 8. In these implementations, the system 10 is configured as a row finder for the combine operator.

For example, as shown in FIG. 10, if a user plants with a 24 row planter 80 and harvests with a 12 row head combine (here, unlike the examples above, the following vehicle 20), the user can set the offset 46 within the system 10 to a specified offset—such as about fifteen feet—off of planter center 84. It is understood that any number of feet or inches is possible as an offset and may be adjusted as needed for specified planter 80 and/or combine 20 or other equipment types, as is readily appreciated.

In this example implementation, a guidance path 12 is generated to guide the combine 30 on a path 2A along the first half of the planter 80 path 2B and then a path 2C aligned with the second half of the planter path 2B, so as to capture all 24 rows planted by the planter 80 accurately, as would be understood. It is appreciated that the value here is that as a combine harvester the guidance path will indicate to the user that they misaligned by a row or not when harvesting, so as to prevent any remainder rows when harvesting that necessitate an additional pass by the combine 20.

In implementations where the planter 80 has a GPS receiver 86 or other communications device, such as mounted to the implement, it is possible to log the location of the planter 80 or implement itself into the system 10, such as via an operations unit 92 in the tractor 90. These implementations allow the combine 30 user to engage auto-steering via an automatic steering system 24 in operable communication with the combine operations unit 33 to create guidance paths 12 via the stored vehicle path data 8. It is appreciated that GPS receiver(s) 86 on the implement can be used on multiple implements beyond just the planting operation.

In implementations where there was not a GPS receiver on the planter 80, it is appreciated that the implement modeled position—such as from a GPS receiver 94 mounted on the tractor 90 and implement hitch offsets—will be close enough for a 30 inch corn row or less to alert the user if they are on the correct row or not.

It is understood that in certain aspects, the planter 80 width is not simply divisible by the combine swath 2A, 2C width, however in these implementations, the system 10 is configured to operate in a manner that would be to their benefit—that is allowing the user to ensure that they are on the desired row/swath 2A, 2C alignment.

Certain implementations feature an alarm system to alert the operator if the system is detecting that the combine is misaligned, like that disclosed above.

Various implementations of these embodiments feature a calibration step, such that if it is determined that the GPS mapping has drifted so as to exceed established tolerances between planting and harvest, the user is able to perform a calibration to the system, as described above.

In implementations involving spraying or side dressing, the sprayer user can load the vehicle path data 8 to be provided with a spraying guidance path. For example, in an exemplary implementations having a 90 foot planter and 90 foot sprayer, the system 10 can provide guidance to align the sprayer with the center of the planted pass. It is understood that for examples with a 30 foot planter and 90 foot sprayer, the system can be configured to calculate out the appropriate rows for the sprayer utilize and establish an appropriate guidance path having a specified offset.

Strip-till operators will do limited tillage and possibly apply fertilizer in strips of a field. These users would find value in planting in these exact same zones.

Today the strip-till operators have to create and manage many guidance paths to make this happen, on the strip-till machine, and then again on the planter. In these implementations, the system 10 guidance paths 12 are automatically propagated and ready for use.

When multiple machines are operating in the same field they can use each the previous pass or composite maps such as maps generated while applying manure, lime or other operations that require guidance. It will be appreciated that such maps can be of high value when the swath width amongst machines is not the same, and the system 10 is able to account for these differences. This represents a technical improvement because today, users would have to all use the same swath width and same guidance pattern to have even guess rows.

Although the present disclosure has been described with reference to preferred embodiments, persons skilled in the art will recognize that changes can be made in form and detail without departing from the spirit and scope of the disclosure.

What is claimed is:

1. An agricultural vehicle guidance system, comprising:
   a) a display unit;
   b) an automatic steering system; and
   c) a processor configured to:
   receive vehicle path data comprising a time series of leading vehicle path data from a leading vehicle;
   store the vehicle path data;
   generate a follow guidance path for a following agricultural vehicle from the stored vehicle path data;
   perform at least one of gap filling and/or curve smoothing on the leading vehicle path data; and
   use the generated follow guidance path to automatically steer the following vehicle with the automatic steering system.

2. The system of claim 1, wherein the leading vehicle path data is received via a cloud server.

3. The system of claim 2, wherein the leading vehicle path data comprises leading vehicle swath data.

4. The system of claim 3, wherein the guidance path is generated by applying an offset to the leading vehicle swath data.

5. The system of claim 4, wherein the vehicle path data comprises following vehicle data comprising sensor data.

6. The system of claim 5, wherein the vehicle path data comprises leading characteristic data and following characteristic data.

7. The system of claim 1, wherein the processor is further configured to:
   i) establish leading vehicle swath and heading; and
   ii) apply an offset.

8. The system of claim 5, wherein the following vehicle data comprises roll, pitch and yaw data.

9. An agricultural vehicle guidance system, comprising:
   a processor configured to:
   receive vehicle path data comprising leading vehicle path data from at least one leading vehicle;
   store the vehicle path data;
   generate a follow guidance path via establishing leading vehicle swath and heading; and
   use the generated follow guidance path to automatically steer a following vehicle with an automatic steering system,
   wherein at least one of the leading vehicles is a planter.

10. The system of claim 9, wherein the leading vehicle path data comprises:
    a) leading vehicle location data; and
    b) leading vehicle swath data.

11. The system of claim 9, wherein the vehicle path data comprises leading characteristic data and following characteristic data.

12. The system of claim 9, wherein the vehicle path data comprises user input data.

13. The system of claim 9, wherein the guidance path generation further comprises establishing swath center and/or establishing swath edge.

14. The system of claim 9, wherein the processor is further configured to gap fill and/or curve smooth.

15. The system of claim 9, wherein the processor is further configured to predict collision points and issue collision warnings.

16. A following agricultural vehicle guidance system comprising:
    a processor configured to:
    receive a series of leading vehicle path data comprising leading vehicle swath data from a leading vehicle;
    store the series of leading vehicle path data;
    generate a follow guidance path for at least one following agricultural vehicle, wherein the leading vehicle swath data comprises previous, adjacent leading vehicle swath data; and
    use the generated follow guidance path to automatically steer the at least one following vehicle with an automatic steering system.

17. The system of claim 16, further comprising an enterprise system configured to be executed by a plurality of following vehicles.

18. The system of claim 16, further comprising a counter reset system constructed and arranged to reset a grain tank counter.

19. The system of claim 16, further comprising a collision alert system.

20. The system of claim 16 configured to utilize sensor data.

* * * * *